US012570826B2

(12) United States Patent　　　(10) Patent No.:　US 12,570,826 B2
Lindberg et al.　　　　　　　　　(45) Date of Patent: 　　Mar. 10, 2026

(54) THERMAL DEPOLYMERIZATION AND MONOMER REPURPOSING USING GEOTHERMAL ENERGY

(71) Applicant: EnhancedGEO Holdings, LLC, St. Petersburg, FL (US)

(72) Inventors: Greg Lindberg, Thonotosassa, FL (US); Kimberly C. Conner, Wetumpka, AL (US)

(73) Assignee: EnhancedGEO Holdings, LLC, St. Petersburg, FL (US)

( * ) Notice: Subject to any disclaimer, the term of this patent is extended or adjusted under 35 U.S.C. 154(b) by 0 days.

(21) Appl. No.: 18/233,655

(22) Filed: Aug. 14, 2023

(65) Prior Publication Data

US 2025/0059340 A1　　Feb. 20, 2025

(51) Int. Cl.
*C08J 11/12*　　　　(2006.01)
*C10G 1/10*　　　　(2006.01)
(Continued)

(52) U.S. Cl.
CPC ................ *C08J 11/12* (2013.01); *C10G 1/10* (2013.01); *C10L 1/04* (2013.01); *F24T 10/10* (2018.05); *F24T 50/00* (2018.05); *C08J 2323/02* (2013.01); *C08J 2325/06* (2013.01); *C08J 2333/12* (2013.01); *C08J 2367/02* (2013.01);
(Continued)

(58) Field of Classification Search
CPC . C08J 11/12; F24T 50/00; F24T 10/10; C10G 1/10; C10G 2400/22; C10G 2300/1003; C10L 1/04; C10L 2200/0461
See application file for complete search history.

(56) References Cited

U.S. PATENT DOCUMENTS

| | | | |
|---|---|---|---|
| 1,043,129 A | 11/1912 | Murphy | |
| 3,498,381 A | 3/1970 | Earlougher, Jr. | |

(Continued)

FOREIGN PATENT DOCUMENTS

| | | |
|---|---|---|
| AU | 2018308861 A1 | 1/2020 |
| AU | 2017268378 B2 | 9/2021 |

(Continued)

OTHER PUBLICATIONS

Melting Points of Rocks (Year: 2020).*

(Continued)

*Primary Examiner* — Youngsul Jeong
(74) *Attorney, Agent, or Firm* — Stephen Y. Liu; Stephanie E. Scoggin; Carstens, Allen, Gourley, LLP

(57) ABSTRACT

A geothermal system including a heat-driven process system using heat extracted from a magma wellbore for driving a thermal process. The system includes a magma wellbore connected to the heat-driven process system in a closed loop. A heated heat transfer fluid conveys the heat from the magma wellbore to a reactor housing a decomposition reaction. The reactor can be a batch reactor, a continuous reactor, or a through-flow reactor. The heat provides the reaction temperature necessary for driving the decomposition reaction of a polymer to an end product. The heat can be provided directly by the heated heat transfer fluid, by an intermediate heat transfer fluid heated by the heated heat transfer fluid, or by a reaction medium heated by the heated heat transfer fluid.

19 Claims, 11 Drawing Sheets

(51) Int. Cl.
C10L 1/04 (2006.01)
F24T 10/10 (2018.01)
F24T 50/00 (2018.01)

(52) U.S. Cl.
CPC ... *C08J 2377/02* (2013.01); *C10G 2300/1003* (2013.01); *C10G 2400/22* (2013.01); *C10L 2200/0461* (2013.01)

(56) References Cited

U.S. PATENT DOCUMENTS

| | | | |
|---|---|---|---|
| 3,613,806 A | 10/1971 | Malott | |
| 3,757,516 A | 9/1973 | Mc | |
| 3,765,477 A | 10/1973 | Van | |
| 3,864,208 A * | 2/1975 | Van Huisen | F24T 10/20 |
| | | | 376/324 |
| 3,950,949 A | 4/1976 | Martin et al. | |
| 3,957,108 A | 5/1976 | Huisen | |
| 3,967,675 A | 7/1976 | Georgii | |
| 4,043,129 A | 8/1977 | McCabe et al. | |
| 4,047,093 A | 9/1977 | Levoy | |
| 4,054,176 A | 10/1977 | Huisen | |
| 4,057,108 A | 11/1977 | Broussard | |
| 4,116,285 A | 9/1978 | Guerber | |
| 4,140,184 A | 2/1979 | Bechtold et al. | |
| 4,492,083 A | 1/1985 | McCabe et al. | |
| 4,642,987 A | 2/1987 | Csorba et al. | |
| 4,665,705 A | 5/1987 | Bonham, Jr. | |
| 4,776,169 A | 10/1988 | Coles, Jr. | |
| 4,929,348 A | 5/1990 | Rice | |
| 5,513,573 A | 5/1996 | Sutton | |
| 5,515,679 A | 5/1996 | Shulman | |
| 5,661,977 A | 9/1997 | Shnell | |
| 5,860,279 A | 1/1999 | Bronicki et al. | |
| 5,911,684 A | 6/1999 | Shnell | |
| 6,708,494 B1 | 3/2004 | Hamann | |
| 7,124,584 B1 | 10/2006 | Wetzel et al. | |
| 8,011,450 B2 | 9/2011 | Krueger et al. | |
| 8,047,285 B1 | 11/2011 | Smith | |
| 8,201,409 B1 | 6/2012 | Zakiewicz | |
| 8,524,787 B2 | 9/2013 | Ermolaev et al. | |
| 9,006,298 B2 | 4/2015 | Leviness et al. | |
| 9,108,858 B2 | 8/2015 | McDonald et al. | |
| 9,150,423 B2 | 10/2015 | Hosono et al. | |
| 9,182,149 B2 | 11/2015 | Gilaberte et al. | |
| 9,298,756 B1 | 3/2016 | Johnson | |
| 9,359,271 B2 | 6/2016 | Leviness et al. | |
| 9,388,797 B2 | 7/2016 | Bronicki | |
| 9,574,551 B2 | 2/2017 | Parrella et al. | |
| 9,650,313 B2 * | 5/2017 | Tippet | B01J 8/062 |
| 9,738,835 B2 | 8/2017 | Schrauwen | |
| 9,765,605 B2 | 9/2017 | Williamson et al. | |
| 10,017,395 B2 | 7/2018 | Kageyama et al. | |
| 10,058,848 B2 | 8/2018 | Lipiec et al. | |
| 10,131,545 B2 | 11/2018 | Sekine et al. | |
| 10,173,202 B2 | 1/2019 | Hosono et al. | |
| 10,203,162 B2 | 2/2019 | Yokomine et al. | |
| 10,279,306 B2 | 5/2019 | Gebald et al. | |
| 10,322,940 B2 | 6/2019 | Hosono et al. | |
| 10,344,233 B2 | 7/2019 | Lucas et al. | |
| 10,358,604 B2 | 7/2019 | Harris et al. | |
| 10,710,049 B2 | 7/2020 | Mikhajlov et al. | |
| 10,745,625 B2 | 8/2020 | Dogterom et al. | |
| 10,759,668 B2 | 9/2020 | Hosono et al. | |
| 10,792,645 B2 | 10/2020 | Hosono et al. | |
| 10,974,969 B2 | 4/2021 | Hu et al. | |
| 11,131,484 B2 | 9/2021 | McBay | |
| 11,235,310 B2 | 2/2022 | Hosono et al. | |
| 11,286,169 B2 | 3/2022 | Beach et al. | |
| 11,325,105 B2 | 5/2022 | Beach et al. | |
| 11,841,172 B2 | 12/2023 | Lindberg et al. | |
| 11,852,383 B2 | 12/2023 | Lindberg et al. | |
| 11,897,828 B1 | 2/2024 | Lindberg et al. | |
| 11,905,797 B2 | 2/2024 | Lindberg et al. | |
| 11,905,814 B1 | 2/2024 | Smith et al. | |

| | | | |
|---|---|---|---|
| 2004/0265158 A1 | 12/2004 | Boyapati et al. | |
| 2006/0026961 A1 | 2/2006 | Bronicki | |
| 2006/0180537 A1 | 8/2006 | Loftis et al. | |
| 2006/0277917 A1 | 12/2006 | Hsu | |
| 2007/0151244 A1 | 7/2007 | Gurin | |
| 2007/0289863 A1 | 12/2007 | Manousiouthakis et al. | |
| 2008/0213157 A1 | 9/2008 | McGrady et al. | |
| 2008/0283411 A1 | 11/2008 | Eastman et al. | |
| 2009/0120288 A1 | 5/2009 | Lackner et al. | |
| 2009/0226308 A1 | 9/2009 | Vandor | |
| 2010/0025260 A1 | 2/2010 | Naterer et al. | |
| 2010/0045042 A1 | 2/2010 | Hinders et al. | |
| 2012/0144829 A1 | 6/2012 | Wiggs et al. | |
| 2012/0237440 A1 | 9/2012 | Kodama et al. | |
| 2013/0101492 A1 | 4/2013 | McAlister | |
| 2013/0232973 A1 | 9/2013 | McBay | |
| 2013/0234444 A1 | 9/2013 | Rogers et al. | |
| 2013/0333383 A1 | 12/2013 | Schwarck | |
| 2014/0262137 A1 | 9/2014 | McBay | |
| 2015/0128931 A1 | 5/2015 | Joshi et al. | |
| 2015/0300327 A1 | 10/2015 | Sweatman et al. | |
| 2015/0368565 A1 | 12/2015 | Schrauwen | |
| 2015/0377211 A1 | 12/2015 | Occhiello | |
| 2016/0097376 A1 | 4/2016 | Wasyluk et al. | |
| 2016/0115945 A1 | 4/2016 | Barsi et al. | |
| 2016/0251953 A1 | 9/2016 | Samuel et al. | |
| 2016/0363350 A1 | 12/2016 | Tahara | |
| 2017/0106331 A1 | 4/2017 | Aronu et al. | |
| 2017/0113184 A1 | 4/2017 | Eisenberger | |
| 2017/0253492 A1 | 9/2017 | Beach et al. | |
| 2018/0106138 A1 | 4/2018 | Randolph | |
| 2018/0224164 A1 | 8/2018 | Lakic | |
| 2019/0157074 A1 | 5/2019 | Delmas et al. | |
| 2019/0359894 A1 | 11/2019 | Heidel et al. | |
| 2020/0040267 A1 | 2/2020 | Willigenburg et al. | |
| 2020/0072199 A1 | 3/2020 | Fontana et al. | |
| 2020/0231455 A1 | 7/2020 | Beach et al. | |
| 2020/0325030 A1 | 10/2020 | Cussler et al. | |
| 2020/0353518 A1 | 11/2020 | Chandran et al. | |
| 2021/0114005 A1 | 4/2021 | Tao et al. | |
| 2021/0122656 A1 | 4/2021 | Willberg et al. | |
| 2021/0230391 A1 * | 7/2021 | Parrott | C07C 67/293 |
| 2021/0371990 A1 | 12/2021 | Amaya et al. | |
| 2023/0130169 A1 | 4/2023 | McIntyre | |
| 2023/0296086 A1 | 9/2023 | Lindberg et al. | |
| 2023/0304705 A1 | 9/2023 | Lindberg et al. | |

FOREIGN PATENT DOCUMENTS

| | | | |
|---|---|---|---|
| AU | 2016398360 B2 | 1/2022 | |
| CN | 105148824 A | 12/2015 | |
| CN | 106837176 A | 6/2017 | |
| CN | 108952650 A | 12/2018 | |
| CN | 112604697 A | 4/2021 | |
| CN | 113494273 A | 10/2021 | |
| CN | 113562692 A | 10/2021 | |
| EP | 0236640 A1 | 9/1987 | |
| EP | 0326736 A2 | 8/1989 | |
| EP | 2792010 B1 | 1/2018 | |
| EP | 3583321 A1 | 12/2019 | |
| GB | 2592695 A | 9/2021 | |
| GB | 2615913 A | 8/2023 | |
| JP | h07286760 A | 10/1995 | |
| JP | 2011052621 A | 3/2011 | |
| JP | 2014202149 A | 10/2014 | |
| JP | 2018200027 A | 12/2018 | |
| JP | 2020067027 A | 4/2020 | |
| WO | 2009116873 A1 | 9/2009 | |
| WO | 2012079078 A2 | 6/2012 | |
| WO | 2012037571 A3 | 7/2012 | |
| WO | 2013025640 A2 | 2/2013 | |
| WO | 2016204287 A1 | 12/2016 | |
| WO | 2019161114 A1 | 8/2019 | |
| WO | 2020150245 A1 | 7/2020 | |
| WO | 2020160500 A1 | 8/2020 | |
| WO | 2021188547 A1 | 9/2021 | |
| WO | 2021257944 A9 | 4/2022 | |

(56) References Cited

FOREIGN PATENT DOCUMENTS

| | | | |
|---|---|---|---|
| WO | 2022123626 A1 | 6/2022 | |
| WO | 2022211643 A1 | 10/2022 | |

OTHER PUBLICATIONS

Boehm, R.F. et al., Modelling of a Magma Energy Geothermal Power Plant, presented at ASME Winter Annual Meeting, Boston MA, Dec. 1987, SAND-87-0564C, DE88 003793, 11 pages.

Colp, John L., Final Report—Magma Energy Research Project, Sandia Report, Sand82-2377, Unlimited Release, UC-66, prepared by Sandia National Laboratories under contrace DE-AC04-76DP00789, Printed Oct. 1982, 42 pages.

Behzadi et al., Thermoeconomic analysis of a hybrid PVT solar system integrated with double effect absorption chiller for cooling/hydrogen production; Energy Equipment andSystems, vol. 6, Issue 4—Serial No. 4 (Dec. 2018), p. 413-427.

Dunn, "Energy Extraction from Crustal Magma Bodies"; Sandia National Laboratories (1982), p. 1-18; URL: https://osti.gov/servlets/purl/6740186-LNgWIn/.

El Tayeb, "Fabrication, Characterisation and Analysis of Ceria Thin Films and Patterned Nanostructured Deposits for Enhanced Solar-Driven Thermochemical Conversion"; Thesissubmitted in partial fulfillment of the requirement for the degree of doctor of philosophy, Dublin City University (Nov. 2016), p. 1-175.

* cited by examiner

700

702 — RECEIVE AN AMOUNT OF POLYMER INTO A REACTOR BODY

704 — EXPOSE AT LEAST THE POLYMER TO A REACTION TEMPERATURE OBTAINED BY HEAT EXTRACTED FROM A MAGMA WELLBORE

706 — DISCHARGE THE END PRODUCT FROM THE REACTOR BODY AFTER A RESIDENCE TIME

900

902 — RECEIVE A CONTINUOUS FLOW
OF POLYMER AND A REACTION
MEDIUM INTO A REACTOR BODY

904 — EXPOSE THE POLYMER AND THE
REACTION MEDIUM TO A REACTION
TEMPERATURE OBTAINED BY HEAT
FROM A MAGMA WELLBORE

906 — DISCHARGE, IN A CONTINUOUS FLOW,
THE END PRODUCT AND THE REACTION
MEDIUM FROM THE REACTOR BODY
AFTER A RESIDENCE TIME

1100

1102 — RECEIVE A POLYMER AND A REACTION MEDIUM INTO A REACTOR

1104 — EXPOSE THE POLYMER AND THE REACTION MEDIUM TO A REACTION TEMPERATURE OBTAINED BY HEAT EXTRACTED FROM A MAGMA WELLBORE TO FORM AN END PRODUCT

1106 — CONVEY THE END PRODUCT AND THE REACTION MEDIUM THROUGH A FILTER AND OUT OF THE REACTOR AFTER A RESIDENCE TIME

THERMAL DEPOLYMERIZATION AND MONOMER REPURPOSING USING GEOTHERMAL ENERGY

TECHNICAL FIELD

The present disclosure relates generally to geothermal systems and related methods, and more particularly to geothermal systems and methods with an underground magma chamber.

BACKGROUND

Solar power and wind power are commonly available sources of renewable energy, but both can be unreliable and have relatively low power densities. In contrast, geothermal energy can potentially provide a higher power density and can operate in any weather condition or during any time of day. However, there exists a lack of tools for effectively harnessing geothermal energy and applying that energy to heat-driven processes.

SUMMARY

Most existing geothermal energy systems are used for heating applications, such as to heat a home or other space. Where geothermal has been attempted for energy production or other higher temperature applications, previous geothermal systems have required significant expenditure of finances, labor, and equipment, rendering them impractical for commercial development. Most previous geothermal systems tap into low temperature resources of less than 194° F. that are relatively near the surface, significantly limiting applications and locations where previous geothermal systems can be deployed. In addition to other disadvantages of previous geothermal technology, the inability of previous technology to efficiently and reliably access high-temperature underground geothermal resources renders conventional geothermal systems technologically and financially impractical.

As used herein, "magma" refers to extremely hot liquid and semi-liquid rock under the Earth's surface. Magma is formed from molten or semi-molten rock mixture found typically between 1 km to 10 km under the surface of the Earth.

As used herein, "borehole" refers to a hole that is drilled to aid in the exploration and recovery of natural resources, including oil, gas, water, or heat from below the surface of the Earth. As used herein, a "wellbore" refers to a borehole either alone or in combination with one or more other components disposed within or in connection with the borehole in order to perform exploration and/or recovery processes.

As used herein, "fluid conduit" refers to any structure, such as a pipe, tube, or the like, used to transport fluids. As used herein "drill stem" refers to a drill pipe consisting of tool joints, a swivel, a bit, a drill string, drill collars, drives, subs, a top drive, shock absorbers, reamers and/or any other related equipment used during the drilling process.

As used herein, "heat transfer fluid" refers to a fluid, e.g., a gas or liquid, that takes part in heat transfer by serving as an intermediary in cooling on one side of a process, transporting and storing thermal energy, and heating on another side of a process. Heat transfer fluids are used in processes requiring heating or cooling. Non-limiting examples of the heat transfer fluid include water, a brine solution, one or more refrigerants, one or more thermal oils, one or more molten salts, one or more ionic liquids, and/or a nanofluid.

As used herein, "reaction medium" refers to a fluid in which a reaction takes place. Examples of the reaction medium can include a solvent with a high vaporization temperature, water, or an amount of heated heat transfer fluid formed from a heat exchange fluid that obtained its heat from heat exchange in the wellbore.

This disclosure recognizes the previously unidentified and unmet need for a geothermal system that harnesses a geothermal resource with a sufficiently high temperature that can aid in facilitating desired processes. For example, an underground geothermal reservoir, such as a magma reservoir, may facilitate the generation of high-temperature, high-pressure steam, while avoiding problems and limitations associated with previous geothermal technology. The geothermal systems of this disclosure generally include a wellbore that extends from a surface into an underground chamber formed in the underground thermal reservoir. The wellbore may have a variety of features and improvements that are described in more detail below. For example, the wellbore may include a specially formed underground chamber that facilitates improved heat transfer by allowing heat transfer fluid to be in direct or near direct thermal contact with magma in the thermal reservoir and allowing the heated heat transfer fluid to be returned to the surface with fewer thermal losses than are experienced with previous technology. As an example, a heat transfer fluid, such as water, can be heated (e.g., converted to steam) and returned to the surface for use in any appropriate high-temperature, high-pressure thermal process, such as energy production, a thermochemical reaction, or the like. In some cases, a molten salt heat transfer fluid is used that remains stable at high temperatures and can aid in forming and maintaining the underground chamber.

This disclosure also recognizes the previously unidentified and unmet need for a geothermal system that harnesses a geothermal resource with sufficiently high amounts of energy from magmatic activity such that the geothermal resource does not degrade significantly over time. This disclosure illustrates improved systems and methods for capturing energy from magma reservoirs, dikes, sills, and other magmatic formations that are significantly higher in temperature than heat sources that are accessed using previous geothermal technologies and that can contain an order of magnitude higher energy density than the geothermal fluids that power previous geothermal technologies. Unlike previous geothermal technologies, certain embodiments of the systems and methods described herein may be resistant to degradation, such that the operating lifetimes of the disclosed systems and methods may be significantly increased over those of previous technologies. In some cases, the present disclosure can significantly decrease energy production costs and/or reliance on non-renewable resources. In some cases, the present disclosure may facilitate the electrification of regions where access to reliable power is currently unavailable. The systems and methods of the present disclosure may also or alternatively aid in decreasing carbon emissions.

This disclosure also recognizes the previously unidentified and unmet need for providing a geothermal system capable of powering a heat-driven process system that can utilize the thermal energy extracted from a wellbore that extends into an underground reservoir of magma, i.e., a magma wellbore. The thermal energy can be used to provide the heat necessary for achieving a reaction temperature that drives a process of interest, such as a thermal decomposition reaction. The thermal energy can also be used to generate electricity that can be used to power electrical components of the heat-driven process system. The heat-driven process system that is powered at least in part by heat extracted from a magma wellbore can provide a clean and cost-effective way of obtaining desirable end products. For example, most plastic recycling repurposes a polymer by melting cleaned and shredded plastics, then extruding the melted plastic into pellets that can be reformed into the original plastic material. However, there are limits to the number of such cycles that can be performed before degradation prevents further reuse. Further, limited demand for certain recycled material or excessive costs, i.e., energy costs, may reduce margins and provide financial disincentives for pursuing plastic recycling. By harnessing geothermal energy from magma wellbores, processes for polymer reuse and/or repurposing can be realized. Heated fluid is obtained from a well bore that extends into an underground normal reservoir, such as a magma chamber. Heat from the heated fluid is used to depolymerize the polymer that would otherwise be discarded. The resulting end products, i.e., monomers, can then be used as reactants to form other materials of interest, such as the same recycled polymer, a different polymer, fuel, etc.

Some embodiments are directed to a system for thermal decomposition of a polymer to an end product. The system includes a wellbore extending from a surface to an underground reservoir of magma. The wellbore provides a heat exchange interface between the magma and a heat transfer fluid to form heated heat transfer fluid. The system also includes a depolymerization system located externally to the wellbore, which includes a reactor configured to house a decomposition reaction occurring at a reaction temperature. The decomposition reaction decomposes the polymer into the end product. The system also includes a network of fluid conduits thermally coupling the wellbore to the depolymerization system. The network of fluid conduits conveys the heated heat transfer fluid from the wellbore to the depolymerization system to provide heat for obtaining the reaction temperature.

Some embodiments are directed to a method of operating a system for conducting a thermal decomposition reaction. The method includes heating a heat transfer fluid in a wellbore extending from a surface to an underground reservoir of magma to form a heated heat transfer fluid. The wellbore provides a heat exchange interface between the magma and the heat transfer fluid. The heated heat transfer fluid is conveyed through a network of fluid conduits thermally coupling the wellbore with a depolymerization system located externally to the wellbore. The depolymerization system includes a reactor configured to house a decomposition reaction occurring at a reaction temperature which decomposes a polymer into an end product. Heat from the heated heat transfer fluid is provided to obtain the reaction temperature in the reactor and the end product is extracted from the reactor after a residence time sufficient to allow for completion of the decomposition reaction.

Some embodiments are directed to a batch reactor configured for a thermal decomposition reaction. The batch reactor includes a reactor body configured to house a decomposition reaction of a polymer into an end product. The decomposition reaction is a batch reaction that occurs at a reaction temperature based on the polymer and a degree of depolymerization and the reaction temperature is obtained by heat absorbed from a wellbore extending from a surface into an underground reservoir of magma. The end product is released from the reactor body after a residence time sufficient to allow for completion of the decomposition reaction.

Some embodiments are directed to a method for conducting a thermal decomposition reaction in a batch reactor. The method includes receiving an amount of a polymer into a reactor body configured to house a decomposition reaction of the polymer into an end product. The polymer is exposed to a reaction temperature obtained by heat absorbed from a wellbore extending from a surface to an underground reservoir of magma. The end product is expelled after a residence time sufficient to allow for completion of the decomposition reaction.

Some embodiments are directed to a continuous reactor usable in a thermal decomposition reaction of a polymer into an end product. The reactor has a reactor body that includes an inlet and an outlet. The decomposition reaction occurs in a reaction medium at a reaction temperature based on the polymer and a degree of depolymerization, and the reaction medium and the polymer are heated to the reaction temperature by heat absorbed from a wellbore extending from a surface into an underground reservoir of magma. The reactor body is configured to receive a steady flow of the reaction medium containing the polymer at the inlet and to expel a steady flow of the reaction medium containing the end product at the outlet of the reactor body.

Some embodiments are directed to a method for conducting a thermal decomposition reaction in a continuous reactor. The method includes receiving a polymer and a steady flow of a reaction medium into a reactor body configured to house a decomposition reaction of the polymer into an end product. The polymer and the reaction medium are exposed to a reaction temperature by heat absorbed from a wellbore extending from a surface to an underground reservoir of magma. A steady flow of the end product and the reaction medium at the outlet.

Some embodiments are directed to a continuous reactor usable in a thermal decomposition reaction of a polymer into an end product. The reactor is configured to house a decomposition reaction of a polymer into an end product. The reactor has a reactor body that includes an inlet end and an outlet end. The decomposition reaction occurs in a reaction medium at a reaction temperature based on the polymer and a degree of depolymerization. The reaction medium and the polymer are heated to the reaction temperature by heat absorbed from a wellbore extending from a surface into an underground reservoir of magma. The reactor also includes a filter disposed in the reactor body between the inlet end and the outlet end. The filter is configured to prevent the polymer in the reactor body from passing through the outlet end and to permit a reaction medium to carry the end product through the filter and out of the outlet end.

Some embodiments are directed to a method for conducting a thermal decomposition reaction in a continuous reactor. The method includes receiving a polymer and reaction medium into a reactor body configured to house a decomposition reaction of the polymer into an end product. The decomposition reaction occurs in the reaction medium at a reaction temperature. The reactor body houses a filter disposed between an inlet end and an outlet end of the reactor body, the filter configured to prevent the polymer in the reactor body from passing through the outlet end and to permit a reaction medium to carry the end product through the filter and out of the outlet end. The method also includes exposing the reaction medium and the polymer to the reaction temperature for a residence time by heat absorbed from a wellbore extending from a surface to an underground reservoir of magma, and conveying the end product and the reaction medium through the filter and out of the outlet end after the residence time.

Certain embodiments may include none, some, or all of the above technical advantages. One or more technical advantages may be readily apparent to one skilled in the art from figures, description, and claims included herein.

BRIEF DESCRIPTION OF THE FIGURES

For a more complete understanding of the present disclosure, reference is now made to the following description, taken in conjunction with the accompanying drawings and detailed description, in which like reference numerals represent like parts.

DETAILED DESCRIPTION

Embodiments of the present disclosure and its advantages will become apparent from the following detailed description when considered in conjunction with the accompanying figures. In the figures, each identical, or substantially similar component that is illustrated in various figures is represented by a single numeral or notation. For purposes of clarity, not every component is labeled in every figure, nor is every component of each embodiment shown where illustration is not necessary to allow those of ordinary skill in the art to understand the disclosure.

The present disclosure includes unexpected observations, which include the following: (1) magma reservoirs can be located at relatively shallow depths of about 2.1-2.5 km; (2) the top layer of a magma reservoir may have relatively few crystals with little or no mush zone; (3) rock near or around magma reservoirs is generally not ductile and can support fractures; (4) a magma reservoir does not decline in thermal output over at least a two-year period; (5) eruptions at drill sites into magma reservoirs are unlikely (e.g., eruptions have not happened at African and Icelandic drill sites in over 10,000 years and it is believed a Kilauea, Hawaii drill site has never erupted); and (6) drilling into magma reservoirs can be reasonably safe.

Figure 1:
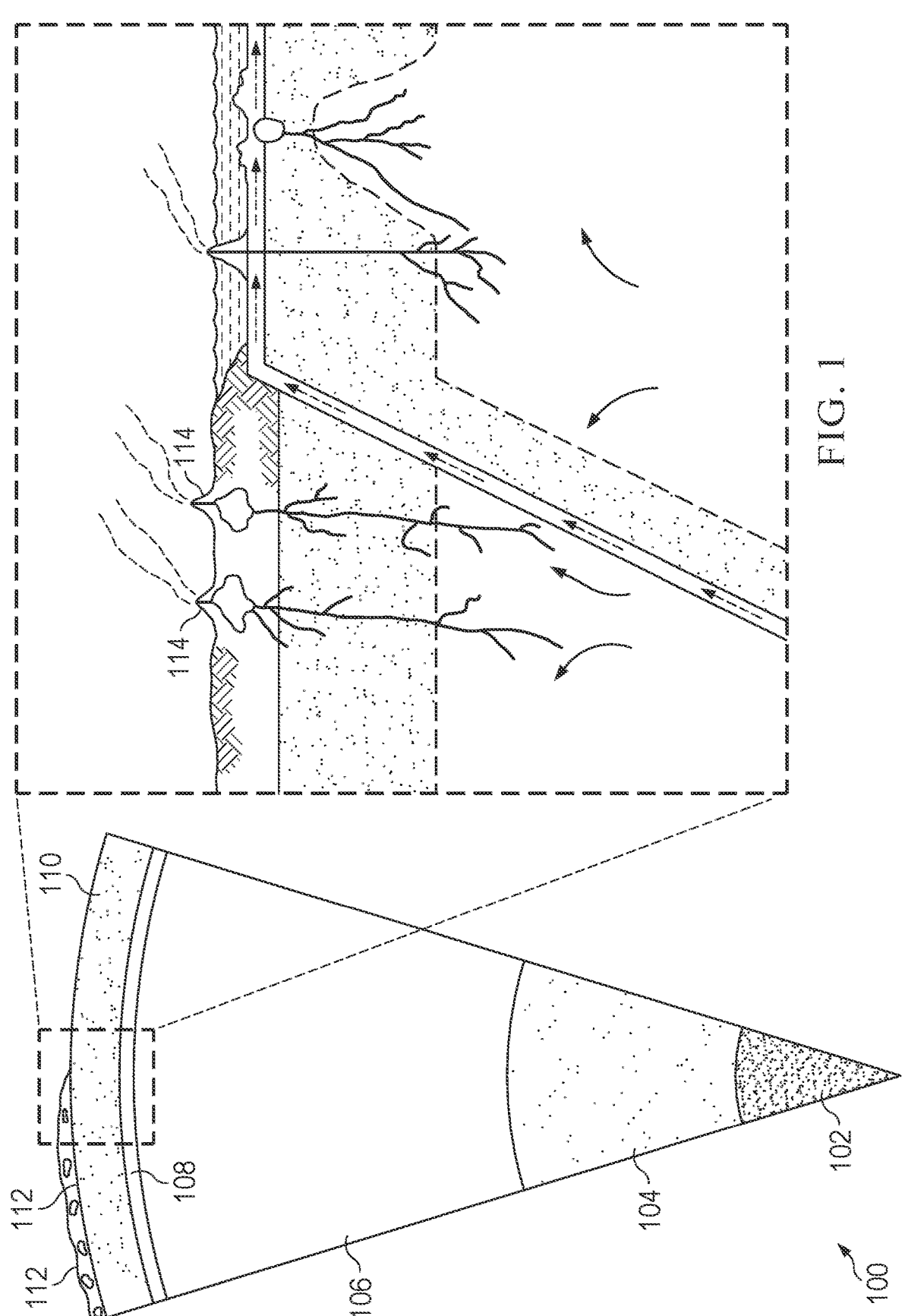
FIG. 1 is a diagram of underground regions near a tectonic plate boundary in the Earth.

FIG. 1 is a partial cross-sectional diagram of the Earth depicting underground formations that can be tapped by geothermal systems of this disclosure (e.g., for generating geothermal power). The Earth is composed of an inner core 102, outer core 104, lower mantle 106, transition zone 108, upper mantle 110, and crust 112. There are places on the Earth where magma reaches the surface of the crust 112 forming volcanos 114. However, in most cases, magma approaches only within a few miles or less from the surface. This magma can heat ground water to temperatures sufficient for certain geothermal power production. However, for other applications, such as geothermal energy production, more direct heat transfer with the magma is desirable.

Figure 2:
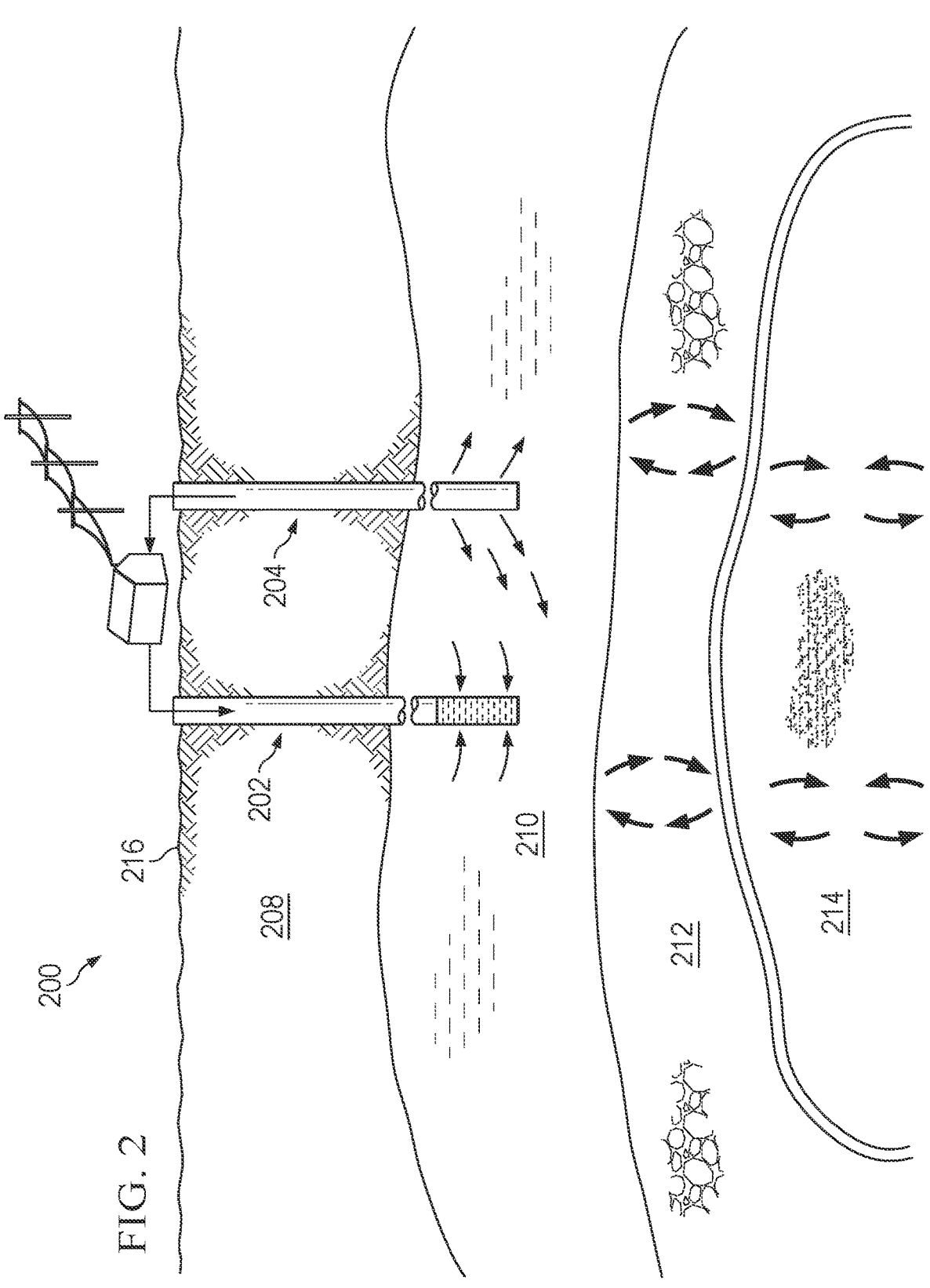
FIG. 2 is a diagram of a conventional geothermal system.

FIG. 2 illustrates a conventional geothermal power generation system 200 that harnesses energy from heated ground water. The geothermal system 200 is a "flash-plant" that generates power from a high-temperature, high-pressure geothermal water extracted from a production well 202. The production well 202 is drilled through rock layer 208 and into the geothermal fluid layer 210 that serves as the source of geothermal water. The geothermal water is heated indirectly via heat transfer with intermediate layer 212, which is in turn heated by magma reservoir 214. Convective heat transfer (illustrated by the arrows indicating that hotter fluids rise to the upper portions of their respective layers before cooling and sinking, then rising again) may facilitate heat transfer between these layers. Geothermal water from layer 210 flows to the surface 216 and is used for geothermal power generation. The geothermal water (and possibly additional water or other fluids) is then injected back into layer 210 via injection well 204.

The configuration of conventional geothermal system 200 of FIG. 2 suffers from drawbacks and disadvantages, as recognized by this disclosure. For example, the system 200 may not achieve temperature sufficient to efficiently and/or effectively drive the reactions described in this disclosure. For example, because geothermal water is a polyphase mixture (i.e., not pure water), the geothermal water flashes at various points along its path up to the surface 216, creating water hammer, which results in a large amount of noise and potential damage to system components. The geothermal water is also prone to causing scaling and corrosion of system components. Chemicals may be added to partially mitigate these issues, but this may result in considerable increases in operational costs and increased environmental impacts, since these chemicals are generally introduced into the environment via injection well 204.

Example Improved Geothermal System

Figure 3:
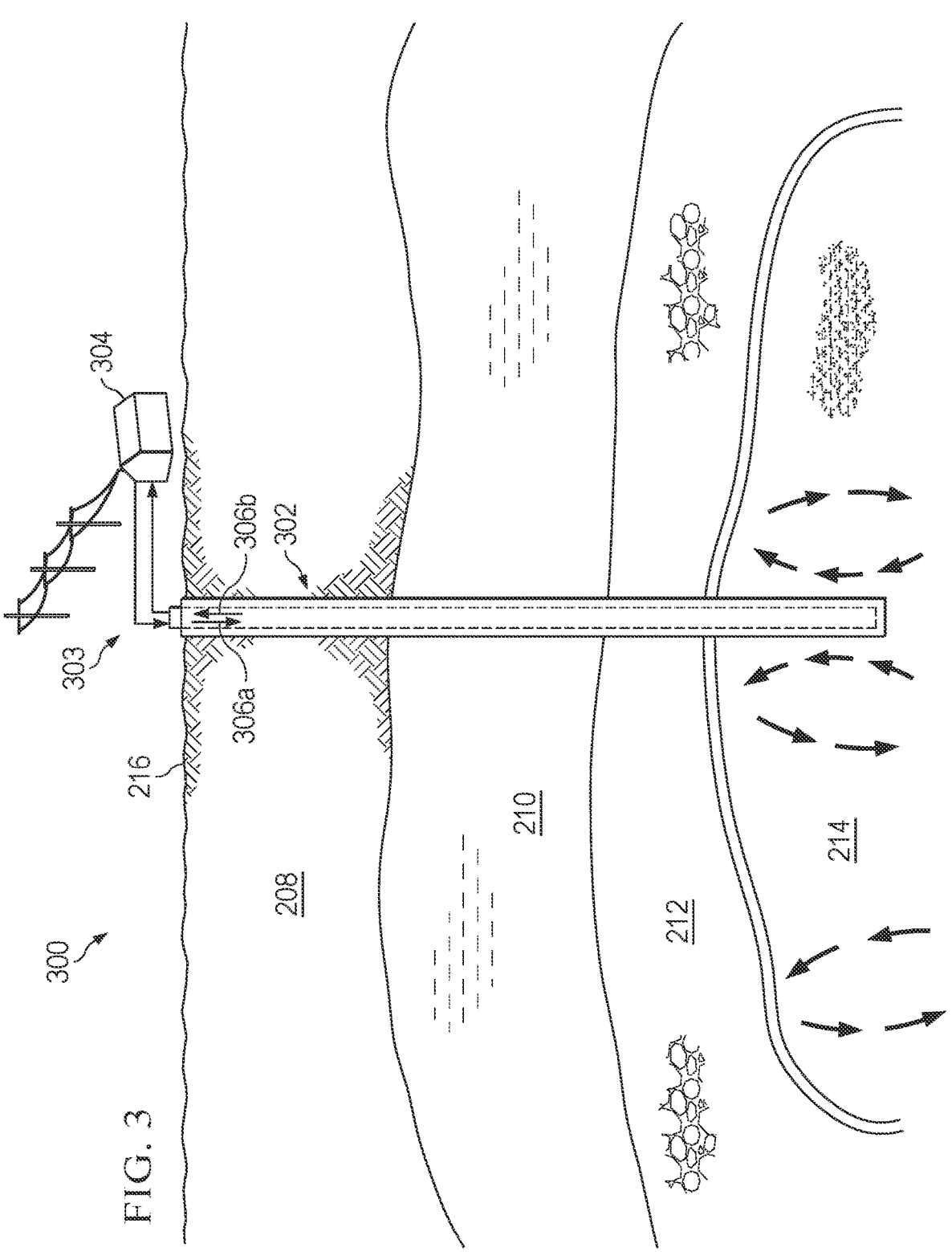
FIG. 3 is a diagram of an exemplary improved geothermal system of this disclosure.

FIG. 3 illustrates an example magma-based geothermal system 300 of this disclosure. The geothermal system 300 includes a wellbore 302 extending from a surface 216 and at least partially into an underground reservoir of magma 214 (hereinafter "magma wellbore 302"). The magma wellbore 302 provides a heat exchange interface between magma in the underground reservoir of magma 214 and a heat transfer fluid conveyed into the magma wellbore 302, represented by arrow 306a, to form a heated heat transfer fluid extracted from the magma wellbore 302, represented by arrow 306b. For convenience, heat transfer fluid may be referred to generally as heat transfer fluid 306, and heat transfer fluid that has lost heat to thermal processes or unit operations may be referred to as cooled or spent heat transfer fluid 306a. Heat transfer fluid extracted from the magma wellbore 302 which has not lost heat to thermal processes or unit operations may be referred to as heated heat transfer fluid 306b.

Examples of wellbores that extending between the surface 216 and the underground reservoir of magma 214 are described in U.S. patent application Ser. No. 18/099,499, filed Jan. 20, 2023, and titled "Geothermal Power from Superhot Geothermal Fluid and Magma Reservoirs"; U.S. patent application Ser. No. 18/099,509, filed Jan. 20, 2023, and titled "Geothermal Power from Superhot Geothermal Fluid and Magma Reservoirs"; U.S. patent application Ser. No. 18/099,514, filed Jan. 20, 2023, and titled "Geothermal Power from Superhot Geothermal Fluid and Magma Reservoirs"; U.S. patent application Ser. No. 18/099,518, filed Jan. 20, 2023, and titled "Geothermal Power from Superhot Geothermal Fluid and Magma Reservoirs"; and U.S. patent application Ser. No. 18/105,674, filed Feb. 3, 2023, and titled "Wellbore for Extracting Heat from Magma Chambers", the entirety of each of which are hereby incorporated by reference.

The geothermal system 300 includes heat-driven process system 304 that is fluidically coupled to the wellbore 302 by a closed loop, represented by arrows 303 (hereinafter "closed loop 303") showing the general direction of fluid flow. The closed loop 303 carries heat transfer fluid 306 between the wellbore 302 and the heat-driven process system 304. The closed loop 303 includes a plurality of fluid conduits that not only carries fluids between the wellbore 302 and the heat drive process system 304, but also throughout the heat-drives process system 304, e.g., depolymerization systems 402 and 502, as described in more detail in FIGS. 4 and 5 that follow.

The heat-driven process system 304 can be configured for one or more thermal processes of interest, such as power generation and a decomposition reaction, such as thermal depolymerization. For example, the heat-driven process system 304 can be configured as a depolymerization system 402 or depolymerization system 502, shown in FIGS. 4 and 5, respectively, which can decompose a polymer into an end product, i.e., a shorter chain polymer or a monomer. The depolymerization system 402, 502 can be located externally to the wellbore 302 and can include a reactor, e.g., reactor 404, configured to house a decomposition reaction occurring at a reaction temperature (e.g., a particular reaction temperature or a temperature range appropriate for a given reaction—see TABLE 1 below). The closed loop 303 conveys the heated heat transfer fluid 306*b* from the wellbore 302 to the depolymerization system 402, 502 to provide heat for obtaining the reaction temperature and/or for the generation of electricity. The cooled heat transfer fluid 306*a* is returned to the wellbore 302 from the depolymerization system 402, 502 for reheating and reuse.

The amount of heat necessary for obtaining the reaction temperature is based on the polymer undergoing the decomposition reaction and/or a degree of depolymerization. An exemplary, non-limiting list of polymers that can undergo depolymerization in depolymerization system 402, 502 are shown below in Table 1 along with the reaction temperature necessary for achieving depolymerization. As discussed in more detail in disclosure below, the reaction temperature can be obtained by heat from a heated heat transfer fluid that obtained its heat from a magma wellbore, an intermediate heat transfer fluid that obtained its heat from the heated heat transfer fluid, a heated heat transfer fluid used as a reaction medium, e.g., molten salt or supercritical water, or a reaction medium heated to the reaction temperature after undergoing heat exchange with the heated heat transfer fluid.

TABLE 1

Exemplary polymers for thermal decomposition using heat extracted directly from a magma wellbore.

| Polymer | End Product | Reaction Temperature (° C.) |
|---|---|---|
| polytetrafluoroethylene (PTFE) | Tetrafluoroethylene (TFE) | 600-900 |

TABLE 1-continued

Exemplary polymers for thermal decomposition using heat extracted directly from a magma wellbore.

| Polymer | End Product | Reaction Temperature (° C.) |
|---|---|---|
| nylon 6 | Caprolactam | 250-400 |
| Polystyrene (PS) | Styrene | 350-450 |
| Polymethyl methacrylate (PMMA) | Methyl methacrylate | 350-400 |
| Polyolefin | Olefin | 450-800 for a pyrolysis reaction in the absence of air |
| Polyolefin | Olefin | Temperature of supercritical water used as reaction medium |
| Polyolefin | Olefin | Temperature of molten salt used as reaction medium |

The geothermal system 300 is a closed system in which a heat transfer fluid 306 is provided down the wellbore 302 to be heated and returned to a thermal or heat-driven process system 304 (e.g., for power generation and/or any other thermal processes of interest). As such, geothermal water is not extracted from the Earth, resulting in significantly reduced risks associated with the conventional geothermal system 200 of FIG. 2, as described further below. Heated heat transfer fluid 306*b* is provided to the thermal or heat-driven process system 304. The heat-driven process system 304 is generally any system that uses the heat transfer fluid to drive a process of interest. For example, the heat-driven process system 304 may include an electricity generation system and/or support thermal processes requiring higher temperatures/pressures than could be reliably or efficiently obtained using previous geothermal technology, such as the system 200 of FIG. 2. Further details of components of exemplary heat-driven process system 304 are provided in the discussion of FIGS. 4 and 5 that follow.

The geothermal system 300 provides technical advantages over previous geothermal systems, such as the conventional geothermal system 200 of FIG. 2. The geothermal system 300 can achieve higher temperatures and pressures for increased energy generation (and/or for more effectively driving other thermal processes). For example, because of the high energy density of magma in magma reservoir 214 (e.g., compared to that of geothermal water of layer 210), a single wellbore 302 can generally create the power of many wells of the conventional geothermal system 200 of FIG. 2. Furthermore, the geothermal system 300 has little or no risk of thermal shock-induced earthquakes, which might be attributed to the injection of cooler water into a hot geothermal zone, as is performed using the previous geothermal system 200 of FIG. 2. The heat transfer fluid in system 300 in FIG. 3 is generally not substantially released into the geothermal zone, resulting in a decreased environmental impact and decreased use of costly materials (e.g., chemical additives that are used and introduced to the environment in great quantities during some conventional geothermal operations). The geothermal system 300 may also have a simplified design and operation compared to those of previous systems. For instance, fewer components and reduced complexity may be needed at the heat-driven process system 304 because only clean heat transfer fluid (e.g., steam) reaches the surface 216. There is no need to separate out solids or other impurities that are common to geothermal water. The example geothermal system 300 may include further components not illustrated in FIG. 3. Further details and examples of different configurations of geothermal systems and methods of their preparation and operation are described in the remaining figures that follow. Additional technical advantages include the ability to recycle or repurpose polymers without the need to incur the excessive costs associated with conventional plastic recycling, as previously discussed.

Figure 4:
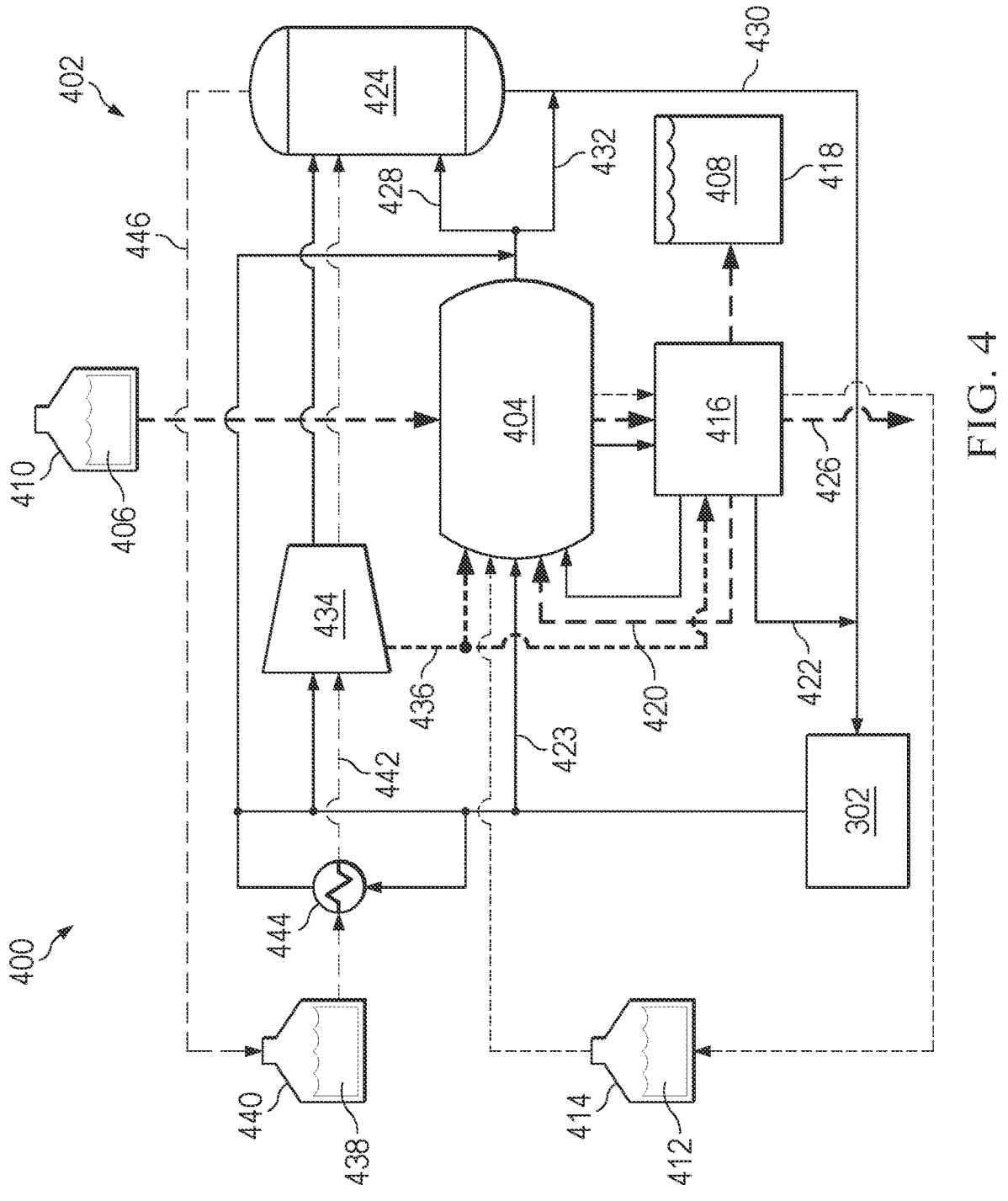
FIG. 4 is a block diagram of an exemplary improved geothermal system of this disclosure.

Heat-Driven Process System with Reactor Obtaining Heat Directly from Heated Heat Transfer Fluid FIG. 4 a block diagram of an exemplary improved geothermal system of this disclosure. The geothermal system 400 includes a heat-driven thermal process system 304 that includes a reactor 404 configured to house a decomposition reaction that decomposes a polymer 406 into an end product 408. The end product 408 can be a monomer of the polymer 406 which can then be used to reform the polymer 406. Alternatively, depending on the polymer, the end product 408 can also be used for other processes, such as a source of fuel. For example, when the polymer 406 is a polyolefin, the monomers can be olefins that are combustible.

In some cases, the polymer 406 is pre-processed to facilitate degradation into its component monomers in the reactor 404. For example, the polymer 406 may be shredded or otherwise broken into small pieces to facilitate reaction. The polymer 406 may be cleaned to remove debris and/or other impurities before the polymer 406 is introduced into the reactor 404. These pre-processing operations may be facilitated using geothermal energy obtained from wellbore 302. For example, a conveyer and/or a shredder that move polymer material and shred the polymer material may be powered by electricity generated using heated heat transfer fluid from the wellbore 302. Similarly, operations to wash the polymer 406 may be facilitated using geothermally generated electricity (e.g., to power fluid pumps, material agitators, and the like).

The reactor 404 can be any form of existing or later developed reactor. For example, the reactor 404 can be a batch reactor, a continuous reactor, or a flow-through reactor, which are shown in more detail in FIGS. 6, 8, and 10, respectively. The reactor 404 receives polymer 406 from a polymer source 410, and optionally an amount of a reaction medium 412 from reaction medium vessel 414. The polymer 406 is then decomposed in the reactor 404 when the polymer 406 is exposed to a reaction temperature for a residence time sufficient to allow the decomposition to proceed to completion. The polymer 406 can be one of the polymers listed in Table 1, or any other polymer that can be decomposed in the appropriate reaction conditions, e.g., presence of sufficient heat and/or pressure, absence of air, etc. As used herein, the term "completion" can be determined based on a percentage of conversion of the polymer or an elapsed period of time. For example, completion of a decomposition reaction can be determined when 75%, 85%, 95%, 99% or 99.9% of the polymer 406 has been decomposed into monomers. Alternatively, completion of the decomposition reaction can be determined after the expiration of a residence time.

In some embodiments, the decomposition reaction occurs in the presence of a reaction medium 412. The reaction medium 412 can be a fluid, non-limiting examples of which can include water (in either liquid, gaseous, or supercritical state) or molten salt. In the system 400 shown in FIG. 4, the polymer 406 and the reaction medium 412 are shown to be introduced into the reactor 404 separately. However, in another embodiment, the polymer 406 and the reaction medium 412 can be introduced in the same feed stream.

Heat for driving the decomposition reaction of the polymer 406 can be provided by the heated heat transfer fluid 306b that is extracted from the magma wellbore 302 and conveyed to the heat-driven thermal process system 304 via the fluid conduits of closed loop 303. In a first embodiment, which is illustrated generally in FIG. 4, heat for obtaining the reaction temperature is provided directly by heated heat transfer fluid 306b (e.g., through a heat exchange interface thermally coupled to the reactor 404, or through the heated heat transfer fluid 306b serving as the reaction medium). In a second embodiment, which is illustrated generally in FIG. 5, heat for obtaining the reaction temperature is provided indirectly by heated heat transfer fluid 306b (e.g., through an intermediate heat exchange fluid undergoing heat exchange at the heat exchange interface thermally coupled to the reactor 404, or through a reaction medium heated to at least the reaction temperature by the heated heat transfer fluid 306b). In either embodiment, the heat exchange interface, shown in FIGS. 6, 8, and 10, can be a jacket coupled to or otherwise thermally engaged with the reactor 404. Thus, the reactor 404 can be a jacketed reactor. The jacketed reactor 404 can be a dual walled vessel where the heated heat exchange fluid is introduced to the volume between the two walls. The jacketed reactor 404 can also be formed from one or more coils encircling the vessel, which can convey the heated heat transfer fluid 306b around the exterior of the reactor 404. In yet another embodiment, the reactor 404 can define a volume that is configured to house both the decomposition reaction, i.e., the polymer 406 and the reaction medium 412 (if any), and also one or more fluid conduits carrying heated heat transfer fluid 306b to the reactor 404 so that the heat is provided internally to the reactor 404.

Figure 6:
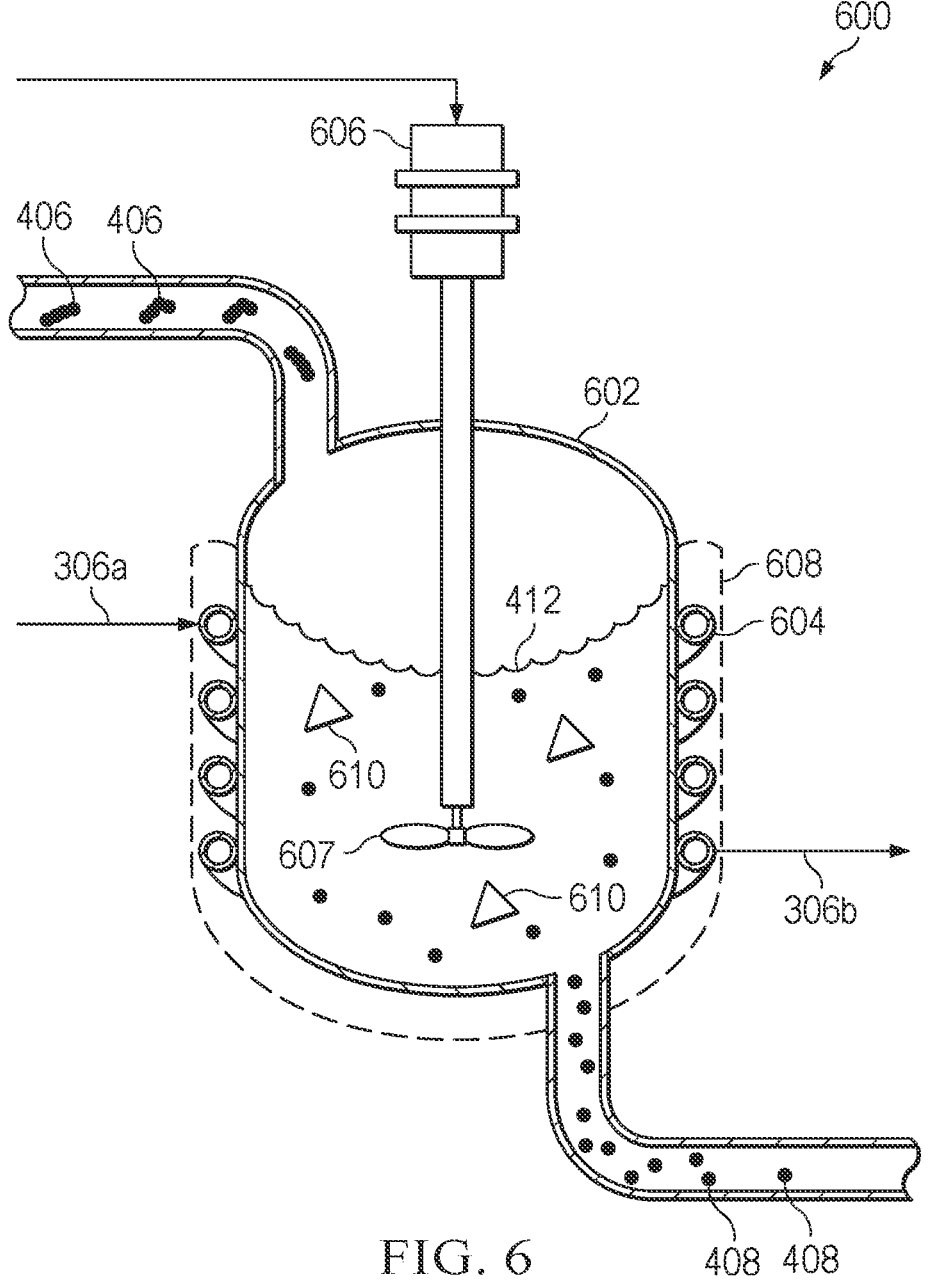
FIG. 6 is a diagram of a batch reactor usable in any of the exemplary improved geothermal systems of this disclosure.

The decomposition reaction can be conducted as a batch reaction or a continuous reaction. Generally, a batch reaction is a non-continuous reaction that takes place in a closed vessel, i.e., a batch reactor, in which the reactants are added to the reactor at the outset, reaction conditions (e.g., temperature, pressure, presence/absence of air) are supplied, and optional agitation is provided. The reactants are maintained in the reactor for a residence time or until the batch reaction is completed. Upon completion of the decomposition reaction, the contents of the batch reactor are extracted/discharged before the batch reactor is resupplied with the reactants so that the process can continue again. The batch reaction can take place in a reaction medium, e.g., reaction medium 412, contained in the batch reactor. The reaction medium can facilitate mixing, heat exchange, and removal of the contents of the batch reactor. Catalysts can be maintained within the reactor (e.g., in a fixed bed) or suspended in the reaction medium that carries the reactants through the reactor. An example of a batch reactor is shown in FIG. 6 that follows, which is configured to receive the polymer 406 and release the end product 408 after the contents of the reactor 600 are exposed to a reaction temperature for a residence time sufficient to allow the polymer 406 to decompose into the end product 408.

Figure 8:
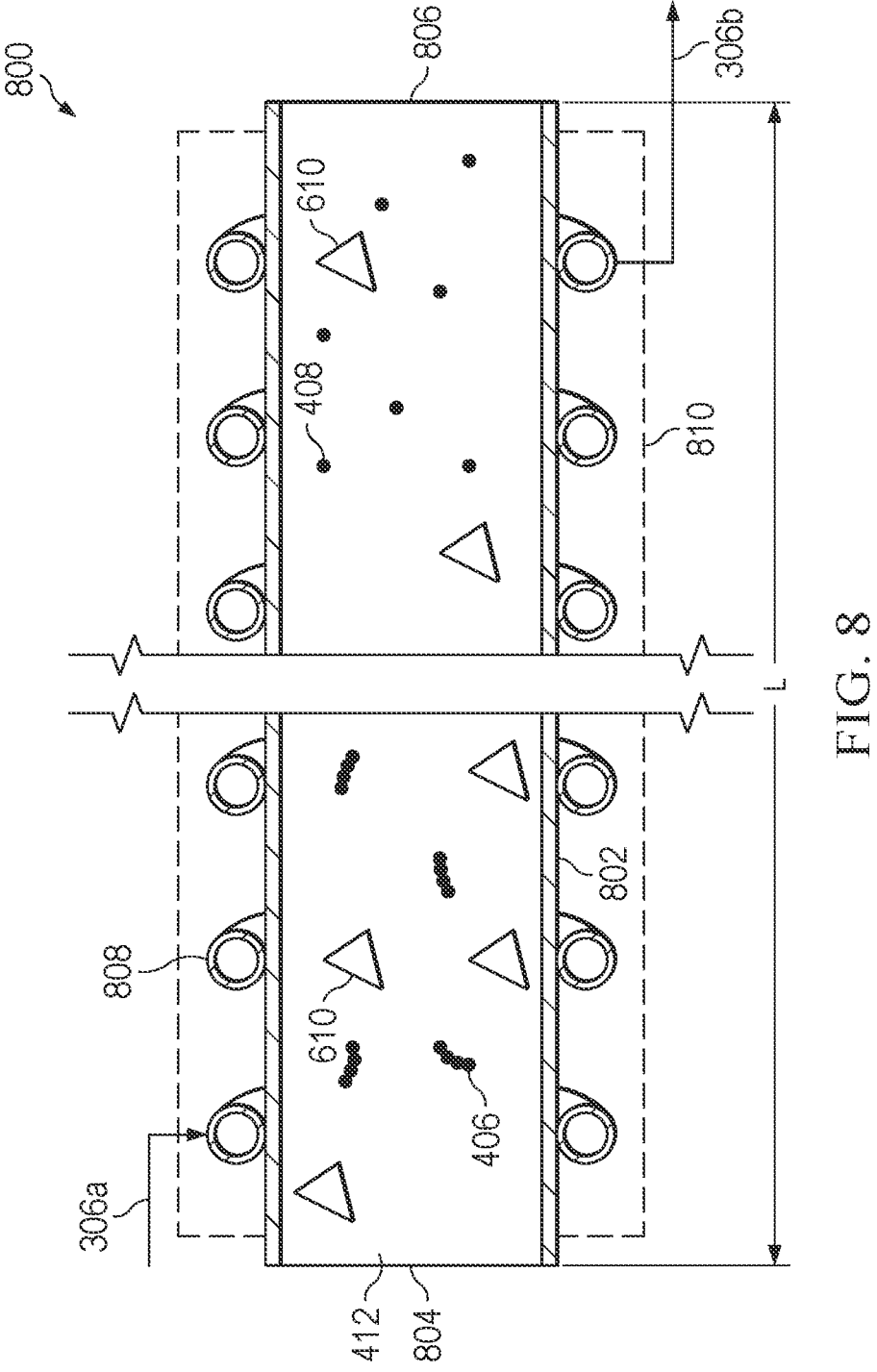
FIG. 8 is a diagram of a continuous reactor usable in any of the exemplary improved geothermal systems of this disclosure.

The decomposition reaction can also be conducted as a continuous reaction. Generally, a continuous reaction occurs in a reactor that receives a continual flow of reactant(s), e.g., polymer 406, and discharges a continuous flow of end product(s), e.g., end product 408. A reaction medium, such as reaction medium 412, can be used to facilitate flow of the reactant into the reactor and end products out of the reactor. The first example of a reactor configured for a continuous reaction is a plug flow reactor 800, which is shown in FIG. 8 that follows. A plug flow reactor is also known as a tubular reactor. Plug flow reactors generally consist of a cylindrical-shaped body, e.g., pipe, with an inlet at one end for receiving reactants and an outlet at an opposite end for expelling and products. Reaction conditions, e.g., reaction temperature and/or pressure, are maintained in the plug flow reactor along its length. The reactants are exposed to the reaction conditions as they flow along the length of the reactor, which allows for decomposition to occur as the reactants flow down the length of the reactor. Catalysts can be maintained within the reactor (e.g., in a fixed bed) or suspended in the reaction medium that carries the reactants through the reactor.

Figure 10:
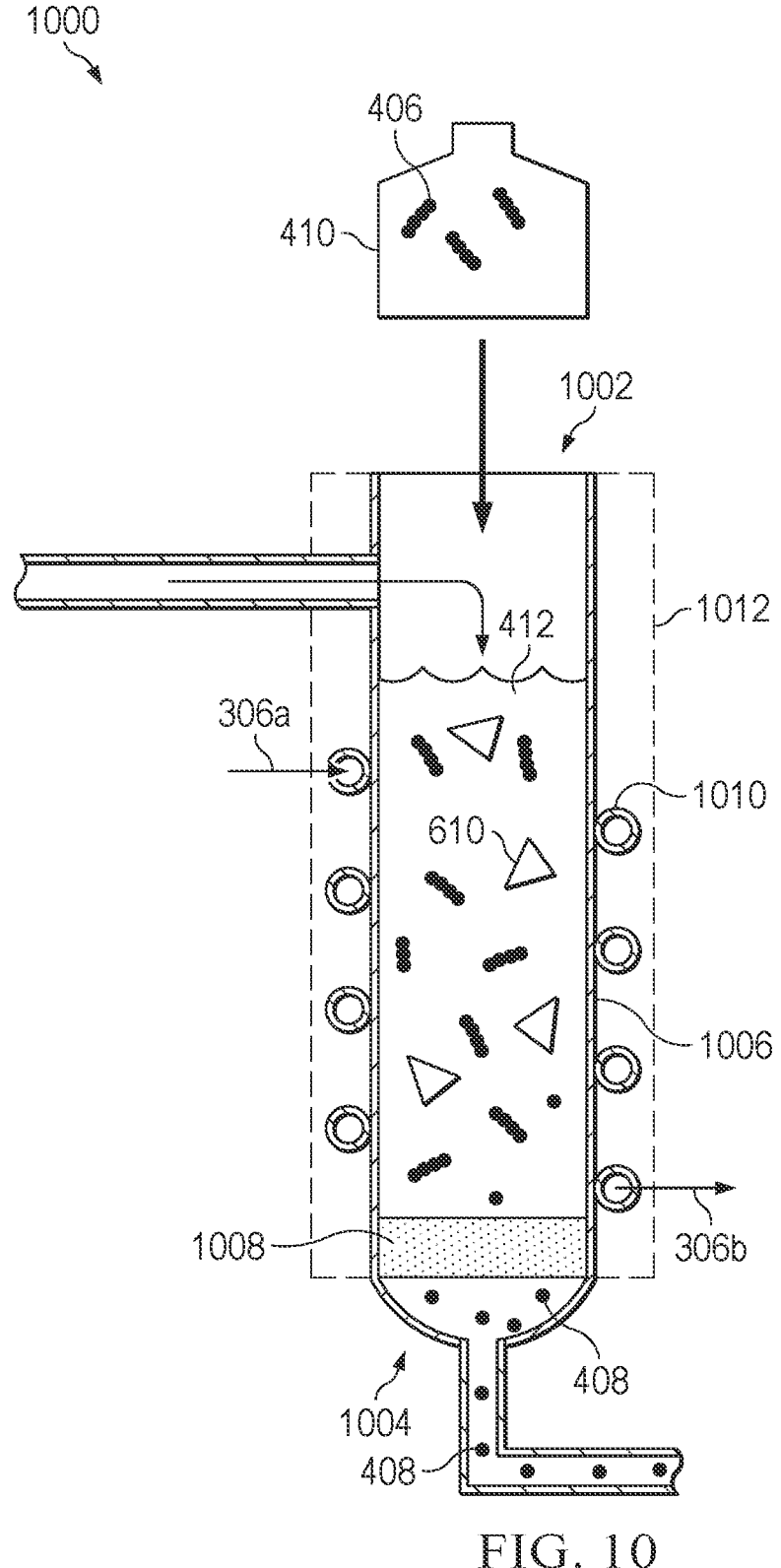
FIG. 10 is a diagram of a flow-through reactor of this disclosure.

Another example of a flow reactor is a flow-through reactor, which is shown in FIG. 10 that follows. A flow through reactor includes a reactor body that defines a volume for containing reactants, e.g., polymer 406, undergoing a reaction, e.g., thermal decomposition. The reactor body includes an inlet end for receiving reactants and a reaction medium, and an outlet end for expelling the reaction medium and end products created by the reaction. A filter is disposed between the inlet end and the outlet end to prevent reactants from being inadvertently discharged from the reactor. In one embodiment the flow through reactor can be charged with an initial amount of a reactant to undergo decomposition. A continuous flow of the reaction medium can then be introduced into the inlet of the reactor while the reactor is maintained at the proper reaction conditions, e.g., reaction temperature and pressure. The polymer is decomposed into the appropriate end products and the continuous flow of reaction medium being discharged from the reactor carries the end products out of the reactor. Occasionally or periodically, the polymer can be resupplied into the reactor so that a constant or near constant amount of end product can be removed from the reactor.

Although not depicted in this disclosure, another example of a flow reactor is a continuously stirred tank reactor (CSTR). The CSTR includes a housing with an inlet that receives a continual flow of a reactant, e.g., polymer 406 that can be carried in with a reaction medium 412 or introduced separately. Contents of the CSTR can be exposed to a reaction temperature for a residence time while being agitated. One or more end products, e.g., end product 408, can be continually extracted from an outlet disposed in the housing The resultant end product(s) formed by the decomposition reaction carried out in the reactor 404 can be extracted from the reactor 404 and sent to post-processing unit 416 for further processing. Post-processing unit 416 can include additional equipment for performing any one or more unit operations for processing the end product 408. For example, post-processing unit 416 can include filtration equipment and/or dehydration equipment to purify or concentrate the end product 408. Once processed, the end product 408 can be transferred from post-processing unit 416 to a product collection vessel 418 for storage.

In this illustrative embodiment and FIG. 4, post-processing unit 416 can also generate one or more recycle streams. For example, the post-processing unit 416 can generate a recycle stream that includes unreacted amounts of the polymer 406 and/or intermediate products formed from the partial decomposition of the polymer 406, which can be returned to the reactor 404 in a recycle stream conduit 420. The recycle stream conduit 420 can also include amounts of a reaction medium 412 in the event that the decomposition reaction occurs in a reaction medium. Alternatively, the reaction medium 412 can be returned directly to reaction medium vessel 414. In the event that the decomposition reaction occurring in the reactor 404 takes place in a reaction medium formed at least in part from heated heat transfer fluid 306*b*, the post-processing unit 416 can include a recycle stream conduit 422 that returns cooled heat transfer fluid 306*a* back to the magma wellbore 302. If the cooled heat transfer fluid 306*a* discharged from the post-processing unit 416 includes a gaseous fraction, all or part of the recycle stream conduit 422 can be sent first to the condenser 424 to convert the cooled heat transfer fluid 306*a* into a liquid state before returning the cooled heat transfer fluid 306*a* to the magma wellbore 302. The post-processing unit 416 may also generate byproducts, i.e., intermediate polymers or other waste products, which can be discharged from the post-processing unit 416 in discharge stream conduit 426.

Condenser 424 can be one or more condensers, each of which can be configured to receive its own feed stream for generating a corresponding condensate. However, condenser 424 is depicted as a single condenser in FIG. 4 for the sake of simplicity. The condenser 424 can include a first condenser that is fluidically connected to reactor 404 and is configured to receive cooled heat transfer fluid 306*a*, which is in a gaseous or at least partially gaseous state, in a condenser feed conduit 428. The cooled heat transfer fluid 306*a* can be condensed and conveyed back to the magma wellbore 302 in condensate return conduit 430. In some embodiments, when the cooled heat transfer fluid 306*a* is already in a condensed state, the spent heat transfer fluid 306*a* can be sent directly to the wellbore 302 in spent heat transfer fluid bypass conduit 432.

The geothermal system 400 is powered, at least in part by heat extracted from the magma wellbore 302. For example, the heat extracted from the magma wellbore 302 provides all or part of the thermal energy required for obtaining the reaction temperature driving the decomposition reaction in the reactor 404. In addition, the heat extracted from the wellbore 302 can provide all or part of the electrical energy required for operating the electrical components of the geothermal system 400, examples of which can include sensors, pumps and compressors, computing devices, mixers, etc. The electrical energy can be generated by one or more turbines, represented by turbine 434. In the embodiment in which the heat transfer fluid 306 is water and the heated heat transfer fluid 306*b* is steam, the heated heat transfer fluid 306*b* can be conveyed directly to the turbine 434 for generating electricity 436, which can be provided to the reactor 404 or the post-processing unit 416 for driving electrical components. If the heated heat transfer fluid 306*b* is not steam, then the heated heat transfer fluid 306*b* can be used to heat an intermediate fluid 438, such as water, to generate a steam feed that can be sent to the turbine 434 in steam feed conduit 442. The steam feed can be generated in heat exchanger 444 which receives the intermediate fluid 438 from vessel 440 and heated heat exchange fluid 306*b* from the wellbore 302. The spent steam exiting the turbine 434 can be sent to condenser 424 to form a condensate that can then be returned to vessel 440 via condensate return stream conduit 446. A more detailed description of a thermal processing system powered, at least in part, by electricity generated from a turbine using heat absorbed from a wellbore can be found in the discussion of a thermal processing subsystem in U.S. patent application Ser. No. 18/116,693, filed Mar. 2, 2023, and titled "Geothermal Systems and Methods with an Underground Magma Chamber", the entirety of which is incorporated herein by reference in its entirety.

In the exemplary system 400 in FIG. 4, the temperature of the heated heat transfer fluid 306*b* introduced into the reactor 404 can be controlled, at least in part, by mixing with heat transfer fluid 306 introduced through conduit 423. The conduit 423 can be connected to a source of heat transfer fluid 306 (not shown), which is maintained at a predetermined temperature, or the conduit 423 can be connected to one or more conduits conveying cooled heat transfer fluid 306*a* throughout the heat-driven process system 402, e.g., the recycle stream conduit 422, the condensate return conduit 430, etc. In another embodiment, the heated heat transfer fluid 306*b* can be sent through a heat exchanger (not shown) before being introduced into the reactor 404.

Figure 5:
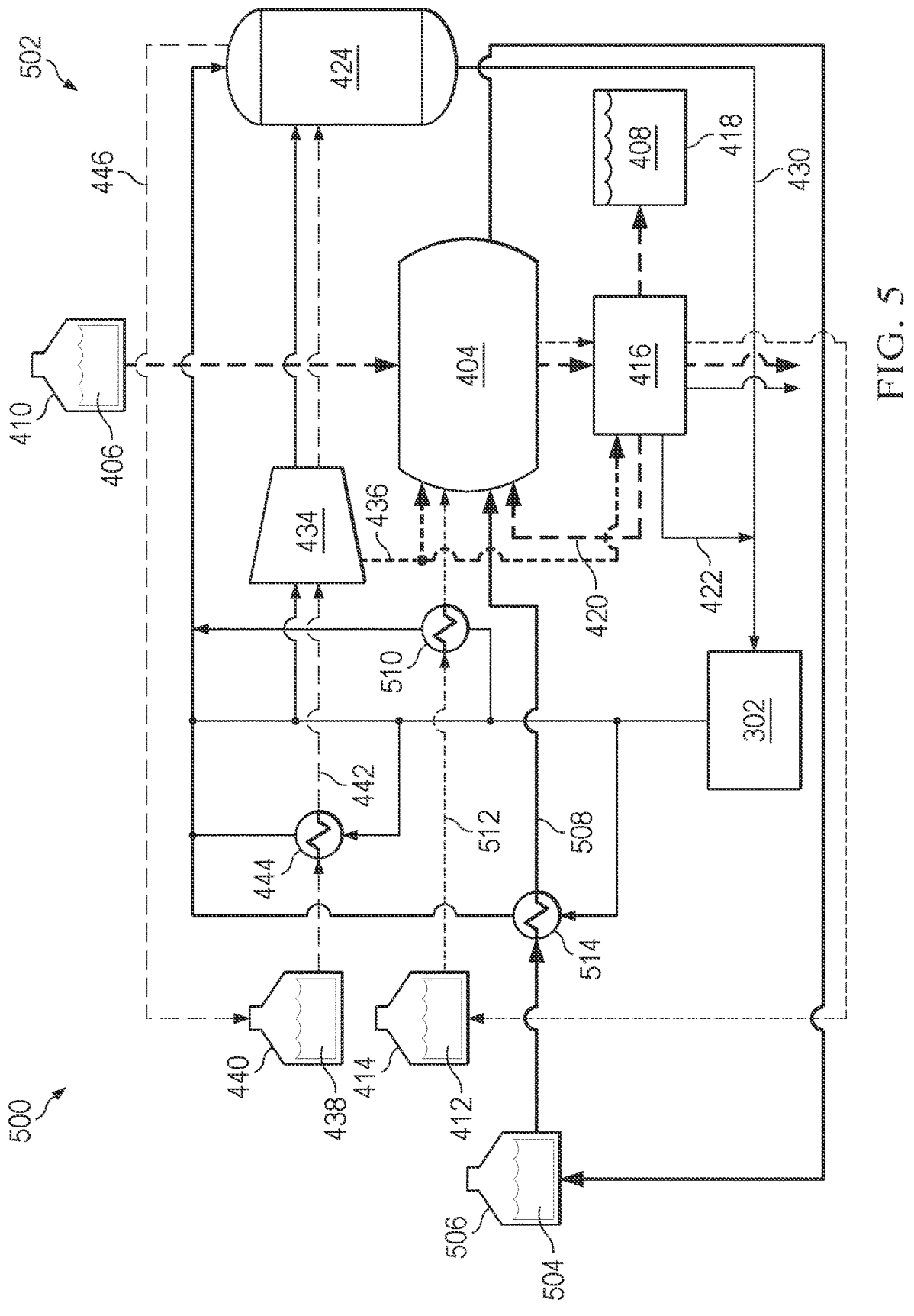
FIG. 5 is another block diagram of an exemplary improved geothermal system of this disclosure.

Heat-Driven Process System with Reactor Obtaining Heat Indirectly from Heated Heat Transfer Fluid FIG. 5 is a block diagram of another exemplary improved geothermal system of this disclosure. Geothermal system 500 is similar to geothermal system 400 except that the heat extracted from the magma wellbore 302 provides indirect heat for driving the depolymerization reaction in the reactor 404 of depolymerization system 502. In contrast, in the exemplary system in FIG. 4, the heated heat transfer fluid 306*b* was sent directly to the reactor 404 for providing direct heat to obtain the reaction temperature, e.g., as the heated reaction medium or as the heated heat transfer fluid providing heat via a heat transfer interface.

In FIG. 5, heat exchanger 514 receives an intermediate heat exchange fluid 504 from vessel 506 and heated heat exchange fluid 306*b* from magma wellbore 302. Heat absorbed by the intermediate heat transfer fluid 504 from the heated heat transfer fluid 306*b* forms a heated intermediate heat transfer fluid that can then be sent to the reactor 404 via heated intermediate heat transfer fluid conduit 508 to provide the heat necessary to obtain the reaction temperature. The cooled intermediate heat transfer fluid can be returned to the vessel 506 if in liquid state or to one of the condensers 424 to form a condensate if in a gaseous state. The cooled heat transfer fluid 306*a* can be sent to another one of the condensers 424 to form a condensate if in a wholly or partially gaseous state before being returned to the magma wellbore 302 in condensate conduit 430. Cooled heat transfer fluid 306*a* not in the gaseous state can be sent directly to the wellbore 302 in a condensate bypass conduit (omitted for the sake of simplicity) that bypasses the condenser 424.

In another embodiment, heat for driving the thermo-chemical reaction can be provided by the reaction medium 412 heated to at least the reaction temperature by heated heat transfer fluid 306*b*. For example, heat exchanger 510 receives the reaction medium 412 from vessel 414 and heated heat exchange fluid 306*b* from magma wellbore 302. Heat absorbed by the reaction medium 412 from the heated heat transfer fluid 306*b* forms a heated reaction medium that can then be sent to the reactor 404 via heated reaction medium conduit 512 to provide the heat necessary to obtain the reaction temperature.

As previously described, the polymer 406 decomposes into the end product 408 in the reactor 404 when exposed to the reaction conditions, e.g., the reaction temperature for a residence time. The decomposition reaction can occur in a reaction medium 412 and/or in the presence of a catalyst 610. Contents of the reactor 404 can then be sent to a post-processing unit 416 to separate the end product 408 from reaction by-products, unreacted amounts of polymer 404, reaction medium 412, etc.

Example Reactors for Use in Heat-Driven Process Systems and Methods of Use

FIG. 6 is a diagram of a batch reactor usable in any of the exemplary improved geothermal systems of this disclosure. For example, reactor 404 identified in the heat-driven process system 304, 402, or 502 can be implemented as batch reactor 600.

Reactor 600 can include a reactor body 602 configured to house a decomposition reaction of a polymer 406 into an end product 408. The decomposition reaction in FIG. 6 is a batch reaction that occurs at a reaction temperature that can be determined based on the polymer undergoing the decomposition reaction. Non-limiting examples of the polymer, a corresponding end product, and reaction temperature are shown in Table 1.

The reaction temperature for the decomposition reaction is obtained by heat extracted from a magma wellbore 302. For example, contents of the reactor 600 can be heated to the reaction temperature by a heated fluid flowing through a heat exchange interface 604 in thermal contact with the reactor body 602. The heated fluid can be the heated heat exchange fluid 306*b* extracted from the wellbore 302 or an intermediate heat exchange fluid 504 heated by the heated heat exchange fluid 306*b*, as described in FIG. 5. The heat exchange interface 604 can be a jacket that at least partially encircles the exterior of the reactor body 602. In the non-limiting example shown in FIG. 6, the jacket is a coiled pipe jacket depicted as receiving a heated heat exchange fluid 306*b* and discharging spent heat exchange fluid 306*b*.

The decomposition reaction occurring in reactor 600 can be carried out in a reaction medium 412. Examples of the reaction medium can include water, molten salt, or the heated heat transfer fluid, as previously described. The reaction medium 412 can be introduced into the reactor 600 along with the polymer 406, or separately from the polymer 406.

In a first example of this embodiment, the reaction medium 412 is the heated heat exchange fluid 306*b* that is extracted from the wellbore 302 and introduced into the reactor 600. In this embodiment, an inlet of the reactor body 602 is fluidically coupled to the closed loop 303 so that heated heat exchange fluid 306*b* from the magma wellbore 302 can be conveyed to the interior of the reactor 600 to serve as the reaction medium. In another embodiment, the reaction medium 412 is different from the heated heat exchange fluid 306*b* but is heated to at least the reaction temperature by heat exchange with the heated heat exchange fluid 306*b*. The heat exchange can occur using conventional heat exchange equipment, such as shell-and-tube heat exchangers, double tube heat exchangers, tube-in-tube heat exchangers, or plate heat exchangers as described in FIGS. 4 and 5 above. In this embodiment, the inlet of the reactor body 602 is coupled a heat exchanger, such as heat exchanger 510, which creates the heated reaction medium.

The reactor 600 can include a mixer 606 configured to agitate contents of the reactor body 602 with an agitator 607, which can take the form of an impeller. The mixer 606 can be powered, at least in part, by electricity 436 generated by the heated heat transfer fluid 306*b* as was described in detail in FIG. 4.

In some embodiments, the decomposition reaction can occur in the presence of a catalyst 610, which lowers the activation energy required. The catalyst 610 can be selected based upon the decomposition reaction that is occurring in the reactor 600. In one embodiment, the catalyst 610 is secured with the reactor body 602, e.g., in a fixed bed, or the catalyst 610 can be introduced into the reactor 600. For example, the catalyst 610 can be carried into the reactor 600 by the reaction medium 412 introduced into the reactor 600, or the catalyst 610 can be introduced into the reactor 600 separately from the polymer 406.

The heat exchange interface 604 can be omitted in favor of an optional insulation layer 608, shown in dashed lines, in the event that the reaction temperature is obtained by heat from the reaction medium 412 introduced into the reactor 600. The insulation layer 608 reduces heat loss from the reactor 600 during the decomposition reaction.

The end product 408 is released from the reactor 600 upon completion of the decomposition reaction and/or after a residence time. The outlet of the reactor 600 can be fluidically coupled to a post-processing unit, such as post-processing unit 416, which is configured to perform a filtration operation and/or a dehydration operation. Thus, upon completion of the decomposition reaction in the reactor body 602, the end product 408 is extracted from the reactor body 602 along with a reaction medium, e.g., reaction medium 412 or heat transfer fluid 306, unreacted polymer 406, intermediate byproducts, and/or waste products, if any, and sent for post-processing as described above in FIG. 4.

Figure 7:
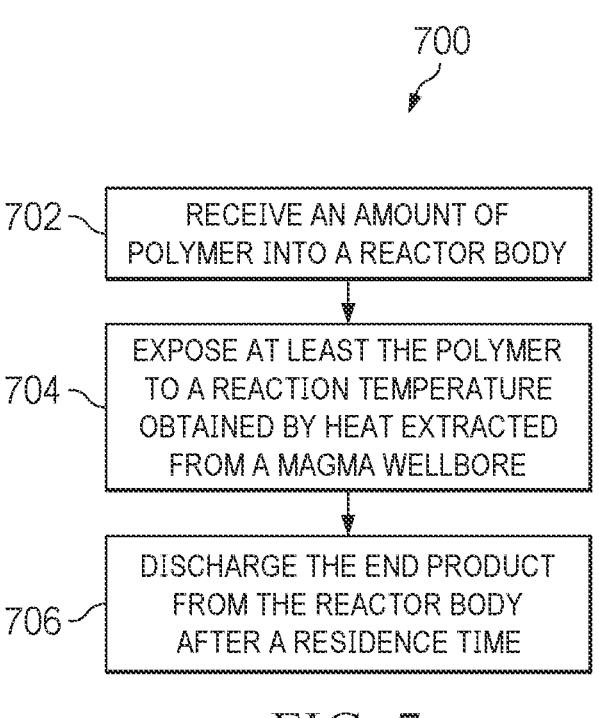
FIG. 7 is a flowchart of a process for operating the batch reactor of this disclosure.

FIG. 7 is a flowchart of a process for operating a batch reactor according to an illustrative embodiment. The process 700 can be implemented in reactor 600.

Process 700 begins at step 702 by receiving an amount of polymer into a reactor body that is configured to house a decomposition reaction of the polymer into an end product. Non-limiting examples of the polymer, a corresponding end product, and reaction temperature are shown in Table 1. The decomposition reaction occurs at a reaction temperature obtained by heat absorbed from a wellbore extending from a surface to an underground reservoir of magma.

In some embodiments, step 702 of receiving the amount of the polymer into the reactor body can also include receiving an amount of a reaction medium into the reactor body. The reaction medium can be a solvent with a high vaporization temperature, water, or an amount of heated heat transfer fluid formed from a heat exchange fluid that obtained its heat from heat exchange in the wellbore. The reaction medium and the polymer can be received into the reactor together in the same feed stream or in separate feed streams.

In some embodiments, step 702 of receiving the amount of the reaction medium into the reactor body can also include the step of agitating a mixture of the polymer and the reaction medium in the reactor body with a mixer powered by electricity generated by the heated heat transfer fluid as described in FIG. 4 above. In addition, or in the alternative, the step 702 of receiving the amount of the reaction medium into the reactor body can also include the step of maintaining the polymer in a presence of a catalyst within the reactor. The catalyst can be constrained, e.g., in a fixed bed, or carried into the reactor by a reaction medium introduced to the reactor body.

In step 704, the polymer is exposed to a reaction temperature obtained by heat absorbed from a magma wellbore. In a first example, the reaction temperature is obtained from heat transfer at a heat transfer interface in thermal contact with the reactor body, the heat transfer occurring between the heated heat transfer fluid (or an intermediate heat transfer fluid) and the contents of reactor. In a second example, the reaction temperature is obtained from a heated reaction medium introduced into the reactor. The heated reaction medium can be the heated heat transfer fluid or a reaction medium that is heated to at least the reaction temperature by heat exchange with the heated heat transfer fluid.

In step 706, the end product is expelled from the reactor body after a residence time sufficient to allow for completion of the decomposition reaction. Expelling the end product can include releasing the end product to a post-processing unit configured to perform at least one of a filtration operation or a dehydration operation.

FIG. 8 is a diagram of a continuous reactor usable in any of the exemplary improved geothermal systems of this disclosure. For example, reactor 404 identified in the heat-driven process system 304, 402, or 502 can be implemented as reactor 800. The continuous reactor 800 is depicted as a plug flow reactor but can take the form of any type of continuous reactor, such as a continuously stirred tank reactor (CSTR).

The reactor 800 is configured to house a decomposition reaction of a polymer 406 into an end product 408. The decomposition reaction occurs in a reaction medium 412 at a reaction temperature for a residence time, both of which can be determined be based on the polymer and a desired degree of depolymerization. The reaction medium 412 and the polymer 406 are heated to the reaction temperature by heat extracted from a magma wellbore 302. The reactor 800, which includes a reactor body 802 that has an inlet 804 and an outlet 806, is configured to receive a steady flow of the reaction medium 412 and the polymer 406 at the inlet 804 and to expel a steady flow of the reaction medium 412 containing the end product 408 at the outlet 806 of the reactor body 802. Examples of the reaction medium can include water, solvent, molten salt, or the heated heat transfer fluid, as previously described.

The contents of the reactor 800 can be heated to the reaction temperature by a heated fluid flowing through a heat exchange interface 808 in thermal contact with the reactor body 802. The heated fluid can be the heated heat exchange fluid 306b extracted from the wellbore 302 or an intermediate heat exchange fluid 504 heated by the heated heat exchange fluid 306b, as described in FIG. 5. The heat exchange interface 808 can be a jacket that at least partially encircles the exterior of the reactor body 802. In the non-limiting example shown in FIG. 8, the jacket is a coiled pipe jacket. The reaction medium 412 and the polymer 406 are exposed to the reaction temperature for a residence time that is determined, at least in part, based on a length L of the reactor body 802 and/or the flow rate of the contents through the reactor body 802.

In some embodiments, the decomposition reaction can occur in the presence of a catalyst 610, which lowers the activation energy required. The catalyst 610 can be selected based upon the decomposition reaction that is occurring in the reactor 800. In one embodiment, the catalyst 610 is secured with the reactor body, e.g., in a fixed bed, or the catalyst can be introduced into the reactor 800 and periodically or continually replenished. For example, the catalyst 610 can be carried into the reactor 800 by the reaction medium 412 introduced into the reactor 800, or the catalyst 610 can be dosed into the reactor 600 continually or periodically along with the polymer 406 or separately from the polymer 406.

The heat exchange interface 808 can be omitted in favor of an optional insulation layer 810, shown in dashed lines, in the event that the reaction temperature is obtained from the reaction medium 412 introduced into the reactor body 802. The insulation layer reduces heat loss from the reactor 800 during the decomposition reaction. In a first example of this embodiment, the reaction medium 412 is the heated heat exchange fluid 306b that is extracted from the wellbore 302 and introduced into the reactor 800. In this embodiment, the inlet 804 of the reactor body 802 is coupled to the closed loop 303 to convey heated heat exchange fluid 306b from the magma wellbore 302 to the interior of the reactor 800 to serve as the reaction medium 412. In another embodiment, the reaction medium 412 is different than the heated heat exchange fluid 306b but is heated to a temperature that is at or above the reaction temperature by heat exchange with the heated heat exchange fluid 306b. The heat exchange can occur using conventional heat exchange equipment, such as shell-and-tube heat exchangers, double tube heat exchangers, tube-in-tube heat exchangers, or plate heat exchangers as described in FIGS. 4 and 5 above. In this embodiment, the inlet of the reactor 600 is coupled a heat exchanger, such as heat exchanger 510, which creates a heated reaction medium 412 using heat from heated heat exchange fluid 306b.

Figure 9:
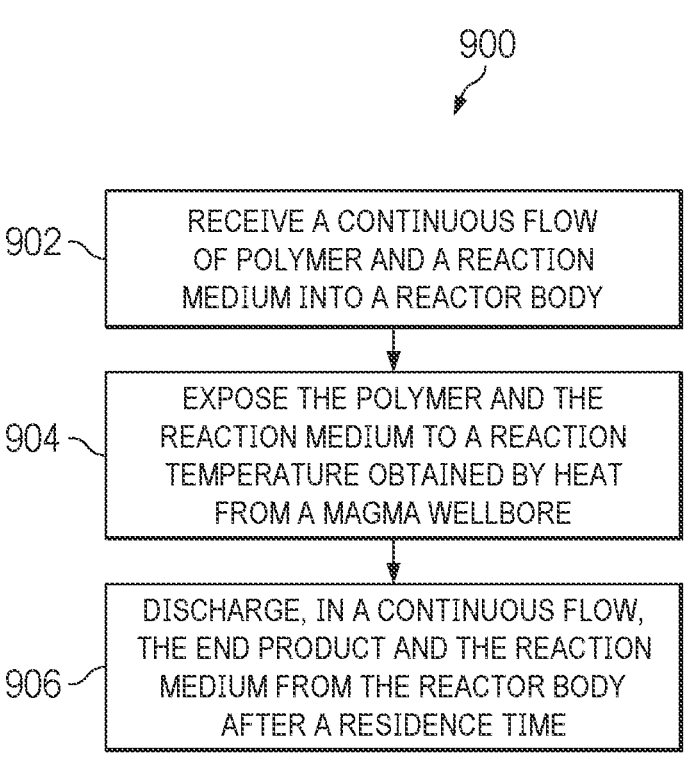
FIG. 9 is a flowchart of a process for operating the continuous reactor of this disclosure.

FIG. 9 is a flowchart of a process for operating continuous reactor according to an illustrative embodiment. The process 900 can be carried out at reactor 800.

Process 900 begins at step 902 by receiving a polymer and a steady, continuous, or at least predictable flow of a reaction medium into a reactor body configured to house a decomposition reaction of the polymer into an end product. Non-limiting examples of the polymer, a corresponding end product, and reaction temperature are shown in Table 1. The decomposition reaction occurs in the reaction medium at a reaction temperature by heat absorbed from a magma wellbore.

In some embodiments, step 902 of receiving the polymer and the reaction medium into the reactor body can include receiving the polymer and the reaction medium in the same feed stream or receiving the polymer in a first feed stream and the reaction medium in separate feed stream. The reaction medium can be a solvent with a high vaporization temperature, water, or an amount of heated heat transfer fluid formed from a heat exchange fluid that obtained its heat from heat exchange in the wellbore.

In step 904, the polymer and the reaction medium are exposed to a reaction temperature. If the reactor is a continuous flow reactor 800, then the residence time of the decomposition reaction can be controlled by controlling a flow rate of the mixture through the reactor body 802. If the reactor is a CSTR, the residence time of the decomposition reaction is controlled, at least in part, by the flow rate of the reaction medium and end product extracted from the outlet of the reactor. In a first example, the reaction temperature is obtained from heat transfer at a heat transfer interface in thermal contact with the reactor body, the heat transfer occurring between the heated heat transfer fluid (or an intermediate heat transfer fluid) and the contents of reactor. In a second example, the reaction temperature is obtained from a heated reaction medium introduced into the reactor. The heated reaction medium can be the heated heat transfer fluid or a reaction medium that is heated to at least the reaction temperature by heat exchange with the heated heat transfer fluid.

In addition or in the alternative, the step 904 of exposing the polymer and the reaction medium to the reaction temperature can also include the step of maintaining the polymer in a presence of a catalyst within the reactor. The catalyst can be constrained, e.g., in a fixed bed, or carried into the reactor by the reaction medium introduced to the reactor body.

In step 906, a steady, continuous, or at least predictable flow of the end product and the reaction medium is removed at the outlet after a residence time. In some embodiments, step 906 can also include conveying the reaction medium and the end product to a post processor that is configured to perform at least one of a filtration operation or a dehydration operation on the end product.

FIG. 10 is a diagram of a flow-through reactor usable in any of the exemplary improved geothermal systems of this disclosure. For example, reactor 404 identified in the heat-driven process system 304, 402, or 502 can be implemented as a flow-through reactor 1000.

The reactor 1000 is configured to house a decomposition reaction of a polymer 406 into an end product 408. The decomposition reaction occurs in a reaction medium at a reaction temperature based on the type of polymer and a degree of depolymerization. The reaction medium and the polymer are heated to the reaction temperature by heat extracted from a magma wellbore 302. Non-limiting examples of the polymer, a corresponding end product, and reaction temperature are shown in Table 1.

Reactor 1000 has an inlet end 1002 separated from an outlet end 1004 by an elongated reactor body 1006. The reactor 1000 receives a steady or continuous flow of a reaction medium 412 and the polymer 406 at the inlet end 1002 through one or more inlets. The reaction medium 412 can be any appropriate fluid, including but not limited to water or molten salt. The reaction medium 412 can carry the polymer 406 into the reactor 1000, or the polymer 406 can be introduced separately into the reactor 1000. In either scenario, the polymer 406 can be introduced continuously or periodically to allow for a continued extraction of end product 408 from the outlet end 1004 of the reactor 1000. For example, the reactor 1000 can receive a reaction medium 412 into the reactor 1000, which is pre-charged with an initial amount of polymer 406. Additional amounts of a polymer 406 can be continuously or periodically introduced into the reactor 1000 through inlet end 1002 along with the reaction medium 412, or through a separate inlet to resupply the polymer 406 that is consumed by the decomposition reaction, which allows for a continued extraction of end product 408 from the outlet end 1004 of the reactor 1000. Alternatively, the reactor 1000 can be initially devoid of polymer 406 and introduced into the reactor 1000 while the reaction medium 412 is introduced, or the polymer 406 can be introduced into the reactor 1000 shortly before or after the reaction medium 412 is introduced.

The reactor body 1006 can house a filter 1008 disposed between the inlet end 1002 and the outlet end 1004. The filter 1008 is configured to prevent the polymer 406 in the reactor body 1006 from passing through the outlet end 1004 but permit a reaction medium 412 to carry the end product 408 through the filter 1008 and out of the outlet end 1004. The filter 1008 can be formed from any acceptable type of filtration media but should be selected for high-temperature applications and with pore sizes that would permit the reaction medium 412 and the end product(s) 408 to pass through while preventing all, or at least an acceptable percentage of the polymer 406 from passing through.

The reaction temperature for the decomposition reaction is obtained by heat extracted from a magma wellbore 302. For example, contents of the reactor 1000 can be heated to the reaction temperature by a heated fluid flowing through a heat exchange interface 1010 in thermal contact with the reactor body 1006. The heated fluid can be the heated heat exchange fluid 306b extracted from the wellbore 302 or an intermediate heat exchange fluid 504 heated by the heated heat exchange fluid 306b, as described in FIGS. 4 and 5. The heat exchange interface 1010 can be a jacket that at least partially encircles the exterior of the reactor body 1006. In the non-limiting example shown in FIG. 1000, the jacket is a coiled pipe jacket.

The heat exchange interface 1010 can be omitted in favor of an insulation layer 1012 in the event that the reaction temperature is achieved by heat from the reaction medium 412 introduced into the reactor 1000. The insulation layer 1012 reduces heat loss from the reactor 1000 during the decomposition reaction. In a first example of this embodiment, the reaction medium 412 is the heated heat exchange fluid 306*b* that is extracted from the wellbore 302 and introduced into the reactor 1000. In this embodiment, the inlet of the reactor body is coupled to the closed loop 303 to convey heated heat exchange fluid 306*b* from the wellbore to the interior of the reactor 1000 to serve as the reaction medium. In another embodiment, the reaction medium 412 is a different fluid than the heated heat transfer fluid 306*b*, but which is heated to at least the reaction temperature by heat exchange with the heated heat exchange fluid 306*b*. The heat exchange between the reaction medium and the heated heat exchange fluid 306*b* can occur using conventional heat exchange equipment, such as shell-and-tube heat exchangers, double tube heat exchangers, tube-in-tube heat exchangers, or plate heat exchangers as described in FIGS. 4 and 5 above. In this embodiment, the inlet of the reactor 1000 is coupled a heat exchanger, such as heat exchanger 510, which creates the heated reaction medium using heat from heated heat exchange fluid 306*b*.

In some embodiments, the decomposition reaction can occur in the presence of a catalyst 610, which lowers the activation energy required. The catalyst 610 can be selected based upon the decomposition reaction that is occurring in the reactor 1000. In one embodiment, the catalyst 610 is secured with the reactor body 1006, e.g., in a fixed bed, or the catalyst 610 can be introduced into the reactor 1000 and periodically or continually replenished. For example, the catalyst 610 can be carried into the reactor 1000 by the reaction medium 412 introduced into the reactor 600, or the catalyst 610 can be dosed into the reactor 600 continually or periodically along with the polymer 406 or separately from the polymer 406.

The outlet end 1004 of the reactor 1000 can be fluidically coupled to a post-processing unit, such as post-processing unit 416 which can perform a filtration operation or a dehydration operation as previously discussed.

Figure 11:
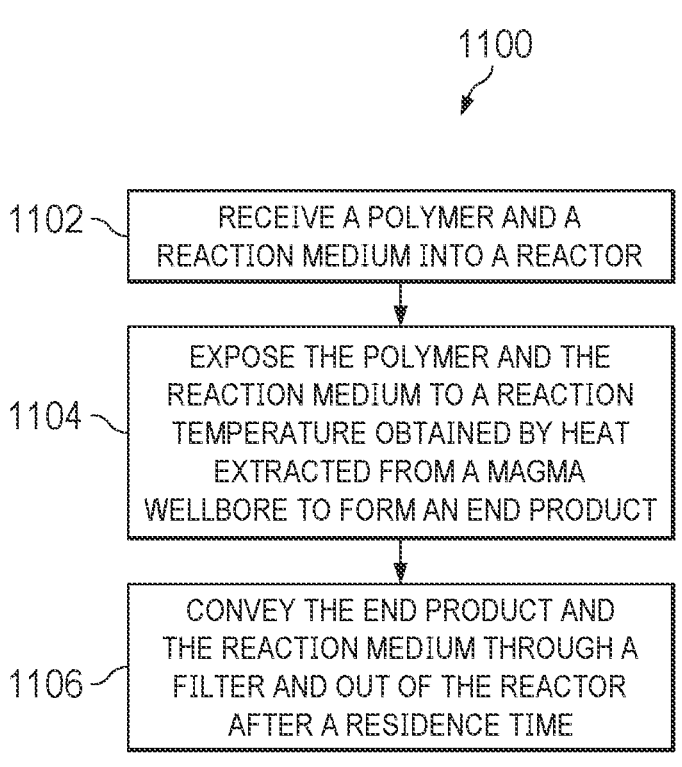
FIG. 11 is a flowchart of a process for operating the flow-through reactor of this disclosure.

FIG. 11 is a flow chart of a process for operating a flow through reactor according to an illustrative embodiment. The process 1100 can be implemented in reactor 1000, which is configured to house a filter disposed between an inlet end and an outlet end of the reactor body. The filter prevents some or all of the polymer in the reactor body from passing through the outlet end while permitting a reaction medium to carry the end product through the filter and out of the outlet end.

Process 1100 begins at step 1102 by receiving a polymer and a reaction medium into a reactor configured to house a decomposition reaction of a polymer into an end product. Non-limiting examples of the polymer, a corresponding end product, and reaction temperature are shown in Table 1. The decomposition reaction occurs in the reaction medium at a reaction temperature by heat absorbed from a wellbore extending from a surface to an underground reservoir of magma.

In some embodiments, step 1102 of receiving the polymer and the reaction medium into the reactor body can include receiving the polymer and the reaction medium in the same feed stream or receiving the polymer in a first feed stream and the reaction medium in separate feed stream. The reaction medium can be a solvent with a high vaporization temperature, water, or an amount of heated heat transfer fluid formed from a heat exchange fluid that obtained its heat from heat exchange in the wellbore.

Step 1102 can also include the additional step of resupplying the reactor with additional amounts of the polymer from a source of the polymer coupled to the reactor. The polymer may need to be resupplied to the reactor if the polymer is not regularly supplied to the reactor in the reaction medium. For example, the polymer can be precharged in the reactor or introduced separately from reaction medium, and then resupplied as necessary.

In step 1104, the reaction medium and the polymer are exposed to a reaction temperature obtained by heat extracted from a magma wellbore. In a first example, the reaction temperature is obtained from heat transfer at a heat transfer interface in thermal contact with the reactor body, the heat transfer occurring between the heated heat transfer fluid (or an intermediate heat transfer fluid) and the contents of reactor. In a second example, the reaction temperature is obtained from a heated reaction medium introduced into the reactor. The heated reaction medium can be the heated heat transfer fluid or a reaction medium that is heated to at least the reaction temperature by heat exchange with the heated heat transfer fluid.

In addition, or in the alternative, the step 1104 of exposing the polymer and the reaction medium to the reaction temperature can also include the step of maintaining the polymer in a presence of a catalyst within the reactor. The catalyst can be constrained, e.g., in a fixed bed, or carried into the reactor by the reaction medium introduced to the reactor body.

In step 1106, the end product and the reaction medium is provided at the outlet after a residence time. The residence time of the reaction medium and the polymer can be controlled by changing a flow rate through the reactor body. The end product and the reaction medium can be conveyed to a post-processing unit configured to perform a filtration operation and/or a dehydration operation on the end product.

Additional Embodiments

The following descriptive embodiments are offered in further support of the one or more aspects of the disclosure:

Embodiment 1. A system for thermal decomposition, the system comprising:

a wellbore extending from a surface to an underground reservoir of magma, wherein the wellbore provides a heat exchange interface between the magma and a heat transfer fluid to form a heated heat transfer fluid;

a depolymerization system located externally to the wellbore, wherein the depolymerization system includes a reactor configured to house a decomposition reaction occurring at a reaction temperature which decomposes a polymer into an end product; and a network of fluid conduits thermally coupling the wellbore to the depolymerization system, wherein the network of fluid conduits conveys the heated heat transfer fluid from the wellbore to the depolymerization system to provide heat for obtaining the reaction temperature, and optionally one or more of the following limitations:

wherein the network of fluid conduits conveys the heated heat transfer fluid to the reactor to provide the heat from the heated heat transfer fluid directly to the reactor;

a heat exchanger disposed in the network of fluid conduits, wherein the heat exchanger is configured to transfer the heat from the heated heat transfer fluid to an intermediate fluid that is provided to the reactor;

wherein the end product is a monomer of the polymer, and wherein:

the polymer is PTFE and the reaction temperature is between 600° C.-900° C.;

the polymer is nylon 6 and the reaction temperature is between 250° C.-400° C.;

the polymer is polystyrene and the reaction temperature is between 350° C.-450° C.; or the polymer is PMMA and the reaction temperature is between 350° C.-400° C.

wherein the polymer is a polyolefin, and wherein the end product is an olefin that is combustible as fuel;

wherein the reactor is a batch reactor configured to receive the polymer and release the end product after a residence time sufficient to allow at least a portion of the polymer to decompose into the end product;

wherein the batch reactor contains a reaction medium, and wherein at least a portion of the polymer decomposes into the end product in the reaction medium;

wherein the reactor is a continuous flow reactor configured to receive the polymer in a continuous flow of a reaction medium and to expel the end product in the continuous flow of the reaction medium;

wherein:

the reactor is a flow-through reactor configured to receive amounts of the polymer and a continuous flow of a reaction medium, a filter disposed in the flow-through reactor prevents the polymer from passing through the reactor, and the continuous flow of the reaction medium carries the end product out of the flow-through reactor;

wherein the depolymerization system includes a post-processing unit coupled to the reactor, wherein the post-processing unit is configured to perform at least one of a filtration operation or a dehydration operation on the end product; and wherein the depolymerization system is powered by electricity generated from the heat of the heated heat transfer fluid.

Embodiment 2. A method of operating a system for thermal decomposition, the method comprising:

heating a heat transfer fluid in a wellbore extending from a surface to an underground reservoir of magma to form a heated heat transfer fluid, wherein the wellbore provides a heat exchange interface between the magma and the heat transfer fluid;

conveying the heated heat transfer fluid through a network of fluid conduits thermally coupling the wellbore with a depolymerization system located externally to the wellbore, wherein the depolymerization system includes a reactor configured to house a decomposition reaction occurring at a reaction temperature which decomposes a polymer into an end product;

providing heat from the heated heat transfer fluid to obtain the reaction temperature in the reactor; and extracting the end product from the reactor after a residence time sufficient to allow for completion of the decomposition reaction, and optionally one or more of the following limitations:

wherein providing the heat from the heat transfer fluid to obtain the reaction temperature further comprises heating the reactor with the heated heat transfer fluid;

wherein providing the heat from the heated heat transfer fluid to obtain the reaction temperature further comprises:

heating an intermediate fluid with the heated heat transfer fluid to form a heated intermediate fluid; and heating the reactor using the heat from the heated intermediate fluid;

wherein the end product is a monomer of the polymer, and wherein:

the polymer is PTFE and the reaction temperature is between 600° C.-900° C.;

the polymer is nylon 6 and the reaction temperature is between 250° C.-400° C.;

the polymer is polystyrene and the reaction temperature is between 350° C.-450° C.; or the polymer is PMMA and the reaction temperature is between 350° C.-400° C.;

wherein the polymer is a polyolefin, and wherein the end product is an olefin that can be combustible as fuel;

wherein the reactor is a batch reactor, and wherein extracting the end product from the reactor upon completion of the decomposition reaction further comprises:

conveying the polymer into the batch reactor; and extracting the end product after a residence time sufficient to allow at least a portion of the polymer to decompose into the end product wherein conveying the polymer into the batch reactor further comprises conveying a reaction medium into the batch reactor, and wherein at least a portion of the polymer decomposes into the end product in the reaction medium;

wherein the reactor is a continuous flow reactor, and wherein extracting the end product from the reactor upon completion of the decomposition reaction further comprises:

conveying the polymer into the continuous flow reactor in a continuous flow of a reaction medium; and extracting the end product in the continuous flow of the reaction medium;

wherein the reactor is a flow-through reactor that includes a filter disposed between an inlet and an outlet of the flow-through reactor, and wherein the extracting the end product from the reactor upon completion of the decomposition reaction further comprises:

receiving periodic charges of the polymer and a continuous flow of a reaction medium;

maintaining the polymer in the flow-through reactor with the filter; and extracting the end product from the flow-through reactor in the continuous flow of the reaction medium;

wherein the depolymerization system includes a post-processing unit coupled to the reactor, and wherein extracting the end product from the reactor upon completion of the decomposition reaction further comprises performing at least one of a filtration operation or a dehydration operation; and wherein the method further comprises powering the depolymerization system using electricity generated from the heat of the heat transfer fluid.

Embodiment 3. A reactor comprising:

a reactor body configured to house a decomposition reaction of a polymer into an end product, wherein:

the decomposition reaction is a batch reaction that occurs at a reaction temperature based on the polymer and a degree of depolymerization, and the reaction temperature is obtained by heat absorbed from a wellbore extending from a surface into an underground reservoir of magma, and the end product is released from the reactor body after a residence time sufficient to allow for completion of the decomposition reaction, and optionally one or more of the following limitations:

a mixer configured to agitate contents of the reactor
body, wherein the mixer is powered by electricity
generated by the heated heat transfer fluid;
wherein:
the decomposition reaction occurs in a reaction medium
that comprises water, and
the reactor further comprises a heat exchange interface in
thermal contact with the reactor body and one of a
heated heat exchange fluid that absorbed the heat from
the wellbore or an intermediate heat exchange fluid that
received the heat from the heated heat exchange fluid;
wherein:
the inlet of the reactor body is coupled to a network of
fluid conduits configured to convey a heat exchange
fluid through the wellbore to form a heated heat
exchange fluid, and
the reaction medium is the heated heat exchange fluid;
wherein:
the inlet of the reactor body is coupled to a source of the
reaction medium, and
the reaction medium and the polymer are heated to the
reaction temperature by a heated heat transfer fluid that
absorbed the heat from the wellbore;
wherein the decomposition reaction occurs in the reac-
tor body in a presence of a catalyst secured within the
reactor body or carried through the reactor body in
the reaction medium;
wherein the end product is a monomer of the polymer,
and wherein:
the polymer is PTFE and the reaction temperature is
between 600° C.-900° C.,
the polymer is nylon 6 and the reaction temperature is
between 250° C.-400° C.,
the polymer is polystyrene and the reaction temperature is
between 350° C.-450° C., and
the polymer is PMMA and the reaction temperature is
between 350° C.-400° C.;
wherein the polymer is a polyolefin and the end product
is an olefin that can be combusted as fuel; and
wherein the reactor body is fluidically coupled to a
post-processing unit configured to perform at least
one of a filtration operation or a dehydration opera-
tion on the end product.
Embodiment 4. A method of operating a reactor, the
method comprising:
receiving an amount of a polymer into a reactor body
configured to house a decomposition reaction of the
polymer into an end product;
exposing the polymer to a reaction temperature obtained
by heat absorbed from a wellbore extending from a
surface to an underground reservoir of magma; and
expelling the end product after a residence time sufficient
to allow for completion of the decomposition reaction,
and optionally one or more of the following limitations:
wherein:
receiving the amount of the polymer into the reactor body
further comprises receiving an amount of a reaction
medium into the reactor body; and
the decomposition reaction occurs in the reaction
medium;
wherein the reaction medium is one of a solvent with a
high vaporization temperature, water, or an amount
of a heated heat transfer fluid that absorbed the heat
from the wellbore;
wherein receiving the amount of the reaction medium
into the reactor body further comprises agitating a
mixture of the polymer and the reaction medium in the reactor body with a mixer powered by electricity
generated from by the heated heat transfer fluid;
wherein:
the reaction medium comprises water, and
the reaction medium and the polymer are heated to the
reaction temperature by receiving the heat at a heat
exchange interface in thermal contact with the reactor
body and one of a heated heat exchange fluid that
absorbed the heat from the wellbore or an intermediate
heat exchange fluid that received the heat from the
heated heat exchange fluid;
wherein the reaction medium is a heated heat exchange
fluid that absorbed the heat directly from the well-
bore;
wherein receiving the polymer in the reactor body of
the reactor further comprises maintaining the poly-
mer in a presence of a catalyst within the reactor,
wherein the catalyst is constrained in a fixed bed or
carried in by a reaction medium introduced to the
reactor body;
wherein the end product is a monomer of the polymer,
and wherein:
the polymer is PTFE and the reaction temperature is
between 600° C.-900° C.;
the polymer is nylon 6 and the reaction temperature is
between 250° C.-400° C.;
the polymer is polystyrene and the reaction temperature is
between 350° C.-450° C.; or
the polymer is PMMA and the reaction temperature is
between 350° C.-400° C.;
wherein the polymer is a polyolefin and the end product
is an olefin that can be combusted as fuel; and
wherein expelling the end product further comprises
releasing the end product to a post-processing unit
configured to perform at least one of a filtration
operation or a dehydration operation.
Embodiment 5. A reactor for a magma-driven decompo-
sition reaction, the reactor comprising:
a reactor body that includes an inlet and an outlet, wherein
the reactor body is configured to house a decomposition
reaction of a polymer into an end product, wherein:
the decomposition reaction occurs in a reaction
medium at a reaction temperature based on the
polymer and a degree of depolymerization,
the reaction medium and the polymer are heated to the
reaction temperature by heat absorbed from a well-
bore extending from a surface into an underground
reservoir of magma, and
the reactor body is configured to receive a steady flow
of the reaction medium containing the polymer at the
inlet and to expel a steady flow of the reaction
medium containing the end product at the outlet of
the reactor body, and optionally one or more of the
following limitations:
wherein:
the reaction medium comprises water,
the reaction medium and the polymer are heated to the
reaction temperature by receiving the heat at a heat
exchange interface in thermal contact with the reactor
body and one of a heated heat exchange fluid that
absorbed the heat from the wellbore or an intermediate
heat exchange fluid that received the heat from the
heated heat exchange fluid;

wherein:

the inlet of the reactor body is coupled to a network of fluid conduits configured to convey a heat exchange fluid through the wellbore to form a heated heat exchange fluid, and the reaction medium is the heated heat exchange fluid;

wherein:

the inlet of the reactor body is coupled to a source of the reaction medium, and the reaction medium and the polymer are heated to the reaction temperature by a heated heat exchange fluid that absorbed the heat from the wellbore;

the decomposition reaction occurs in the reactor body in a presence of a catalyst secured within the reactor body or carried through the reactor body in the reaction medium;

wherein the end product is a monomer of the polymer, and wherein:

the polymer is PTFE and the reaction temperature is between 600° C.-900° C.;

the polymer is nylon 6 and the reaction temperature is between 250° C.-400° C.;

the polymer is polystyrene and the reaction temperature is between 350° C.-450° C.; or the polymer is PMMA and the reaction temperature is between 350° C.-400° C.;

wherein the polymer is a polyolefin and the end product is an olefin that can be combusted as fuel; and wherein the reactor body is fluidically coupled to a post-processing unit configured to perform a filtration operation or a dehydration operation on the end product.

Embodiment 6. A method for a magma-driven decomposition reaction, the method comprising:

receiving a polymer and a steady flow of a reaction medium into a reactor body configured to house a decomposition reaction of the polymer into an end product;

exposing the polymer and the reaction medium to a reaction temperature by heat absorbed from a wellbore extending from a surface to an underground reservoir of magma; and providing a steady flow of the end product and the reaction medium at the outlet after a residence time, and optionally one or more of the following limitations:

wherein:

the reaction medium comprises water, and the reaction medium and the polymer are heated to the reaction temperature by receiving the heat at a heat exchange interface in thermal contact with the reactor body and one of a heated heat exchange fluid that absorbed the heat from the wellbore or an intermediate heat exchange fluid that received the heat from the heated heat exchange fluid;

wherein the reaction medium is a heated heat exchange fluid formed from a heat exchange fluid that undergoes heat exchange in the wellbore to form the heated heat transfer fluid;

wherein the reaction medium and the polymer are heated to the reaction temperature by heat exchange with a heated heat exchange fluid that absorbed the heat from the wellbore;

the decomposition reaction occurs in the reactor body in a presence of a catalyst secured within the reactor body or carried through the reactor body in the reaction medium;

wherein the end product is a monomer of the polymer, and wherein:

the polymer is PTFE and the reaction temperature is between 600° C.-900° C.;

the polymer is nylon 6 and the reaction temperature is between 250° C.-400° C.;

the polymer is polystyrene and the reaction temperature is between 350° C.-450° C.; or the polymer is PMMA and the reaction temperature is between 350° C.-400° C.;

wherein the polymer is a polyolefin and the end product is an olefin that can be combusted as fuel; and wherein providing the end product and the reaction medium at the outlet further comprises conveying the end product and the reaction medium to a post-processing unit configured to perform a filtration operation or a dehydration operation on the end product.

Embodiment 7. A reactor for a magma-driven decomposition reaction, the reactor comprising:

a reactor body that includes an inlet end and an outlet end, wherein the reactor body is configured to house a decomposition reaction of a polymer into an end product, wherein:

the decomposition reaction occurs in a reaction medium at a reaction temperature based on the polymer and a degree of depolymerization, and the reaction medium and the polymer are heated to the reaction temperature by heat absorbed from a wellbore extending from a surface into an underground reservoir of magma; and a filter disposed in the reactor body between the inlet end and the outlet end, wherein the filter is configured to prevent the polymer in the reactor body from passing through the outlet end and to permit a reaction medium to carry the end product through the filter and out of the outlet end, and optionally one or more of the following limitations:

wherein the reactor is coupled to a source of the polymer, and wherein the reactor is configured to receive additional amounts of the polymer throughout the decomposition reaction;

wherein:

the reaction medium comprises water, and the reaction medium and the polymer are heated to the reaction temperature by receiving the heat at a heat exchange interface in thermal contact with the reactor body and one of a heated heat exchange fluid that absorbed the heat from the wellbore or an intermediate heat exchange fluid that received the heat from the heated heat exchange fluid;

wherein:

the inlet end of the reactor body is coupled to a network of fluid conduits configured to convey a heat exchange fluid through the wellbore to form a heated heat exchange fluid, and the reaction medium is the heated heat exchange fluid;

wherein:

the inlet end of the reactor body is coupled to a source of the reaction medium, and the reaction medium and the polymer are heated to the reaction temperature by a heated heat exchange fluid that absorbed the heat from the wellbore;

the decomposition reaction occurs in the reactor body in a presence of a catalyst secured within the reactor body or carried through the reactor body in the reaction medium;

wherein the end product is a monomer of the polymer, and wherein:

the polymer is PTFE and the reaction temperature is between 600° C.-900° C.;

the polymer is nylon 6 and the reaction temperature is between 250° C.-400° C.;

the polymer is polystyrene and the reaction temperature is between 350° C.-450° C.;

the polymer is PMMA and the reaction temperature is between 350° C.-400° C.

wherein the polymer is a polyolefin and the end product is an olefin that can be combusted as fuel; and wherein the reactor body is fluidically coupled to a post-processing unit configured to perform a filtration operation or a dehydration operation on the end product.

Embodiment 8. A method for a magma-driven decomposition reaction, the method comprising:

receiving a polymer and reaction medium into a reactor body configured to house a decomposition reaction of the polymer into an end product, wherein:

the decomposition reaction occurs in the reaction medium at a reaction temperature;

the reactor body houses a filter disposed between an inlet end and an outlet end of the reactor body, and the filter is configured to prevent the polymer in the reactor body from passing through the outlet and to permit a reaction medium to carry the end product through the filter and out of the outlet;

exposing the reaction medium and the polymer to the reaction temperature for a residence time by heat absorbed from a wellbore extending from a surface to an underground reservoir of magma; and conveying the end product and the reaction medium through the filter and out of the outlet after the residence time, and optionally one or more of the following limitations:

resupplying the reactor with additional amounts of the polymer from a source of the polymer coupled to the reactor;

wherein:

the reaction medium comprises water, and the reaction medium and the polymer are heated to the reaction temperature by receiving the heat at a heat exchange interface in thermal contact with the reactor body and one of a heated heat exchange fluid that absorbed the heat from the wellbore or an intermediate heat exchange fluid that received the heat from the heated heat exchange fluid;

wherein the reaction medium is a heated heat exchange fluid formed from a heat exchange fluid that undergoes heat exchange in the wellbore to form the heated heat transfer fluid;

wherein the reaction medium and the polymer are heated to the reaction temperature by heat exchange with a heated heat exchange fluid that absorbed the heat from the wellbore;

the decomposition reaction occurs in the reactor body in a presence of a catalyst secured within the reactor body or carried through the reactor body in the reaction medium;

wherein the end product is a monomer of the polymer, and wherein:

the polymer is PTFE and the reaction temperature is between 600° C.-900° C.;

the polymer is nylon 6 and the reaction temperature is between 250° C.-400° C.;

the polymer is polystyrene and the reaction temperature is between 350° C.-450° C.; or the polymer is PMMA and the reaction temperature is between 350° C.-400° C.

wherein the polymer is a polyolefin and the end product is an olefin that can be combusted as fuel; and wherein providing the end product and the reaction medium at the outlet further comprises conveying the end product and the reaction medium to a post-processing unit configured to perform a filtration operation or a dehydration operation on the end product.

Although embodiments of the disclosure have been described with reference to several elements, any element described in the embodiments described herein are exemplary and can be omitted, substituted, added, combined, or rearranged as applicable to form new embodiments. A skilled person, upon reading the present specification, would recognize that such additional embodiments are effectively disclosed herein. For example, where this disclosure describes characteristics, structure, size, shape, arrangement, or composition for an element or process for making or using an element or combination of elements, the characteristics, structure, size, shape, arrangement, or composition can also be incorporated into any other element or combination of elements, or process for making or using an element or combination of elements described herein to provide additional embodiments. Moreover, items shown or discussed as coupled or directly coupled or communicating with each other may be indirectly coupled or communicating through some interface device, or intermediate component whether electrically, mechanically, fluidically, or otherwise.

While this disclosure has been particularly shown and described with reference to preferred or example embodiments, it will be understood by those skilled in the art that various changes in form and detail may be made therein without departing from the spirit and scope of the disclosure. Accordingly, this disclosure includes all modifications and equivalents of the subject matter recited in the claims appended hereto as permitted by applicable law. Changes, substitutions and alterations are ascertainable by one skilled in the art and could be made without departing from the spirit and scope disclosed herein. Moreover, any combination of the above-described elements in all possible variations thereof is encompassed by the disclosure unless otherwise indicated herein or otherwise clearly contradicted by context.

Additionally, where an embodiment is described herein as comprising some element or group of elements, additional embodiments can consist essentially of or consist of the element or group of elements. Also, although the open-ended term "comprises" is generally used herein, additional embodiments can be formed by substituting the terms "consisting essentially of" or "consisting of."

What is claimed is:

1. A system for thermal decomposition, the system comprising:

a wellbore extending from a surface to an underground reservoir at least partially filled with magma that includes molten rock, wherein the wellbore provides a heat exchange interface between the magma and a heat transfer fluid to form a heated heat transfer fluid;

a depolymerization system located externally to the wellbore, wherein the depolymerization system includes a reactor configured to house a decomposition reaction occurring at a reaction temperature which decomposes a polymer into an end product, wherein the reactor is a batch reactor configured to receive the polymer and release the end product after a residence time sufficient to allow at least a portion of the polymer to decompose into the end product; and a network of fluid conduits thermally coupling the wellbore to the depolymerization system, wherein the network of fluid conduits conveys the heated heat transfer fluid from the wellbore to the depolymerization system to provide heat for obtaining the reaction temperature.

2. The system of claim 1, wherein the network of fluid conduits conveys the heated heat transfer fluid to the reactor to provide the heat from the heated heat transfer fluid directly to the reactor.

3. The system of claim 1, further comprising:

a heat exchanger disposed in the network of fluid conduits, wherein the heat exchanger is configured to transfer the heat from the heated heat transfer fluid to an intermediate fluid that is provided to the reactor.

4. The system of claim 1, wherein the end product is a monomer of the polymer, and wherein:

the polymer is polytetrafluoroethylene (PTFE) and the reaction temperature is between 600° C.-900° C.;

the polymer is nylon 6 and the reaction temperature is between 250° C.-400° C.;

the polymer is polystyrene and the reaction temperature is between 350° C.-450° C.; or the polymer is polymethyl methacrylate (PMMA) and the reaction temperature is between 350° C.-400° C.

5. The system of claim 1, wherein the polymer is a polyolefin, and wherein the end product is an olefin that is combustible as fuel.

6. The system of claim 1, wherein the batch reactor contains a reaction medium, and wherein at least a portion of the polymer decomposes into the end product in the reaction medium.

7. The system of claim 1, wherein the depolymerization system includes a post-processing unit coupled to the reactor, wherein the post-processing unit is configured to perform at least one of a filtration operation or a dehydration operation on the end product.

8. The system of claim 1, wherein the depolymerization system is powered by electricity generated from the heat of the heated heat transfer fluid.

9. The system of claim 1, wherein the reactor comprises a heat exchange interface comprising a jacket that at least partially encircles an exterior of the reactor, wherein the heat exchange interface is configured to receive heated heat transfer fluid from the wellbore to provide heat for obtaining the reaction temperature.

10. The system of claim 1, wherein:

the depolymerization system further comprises a heat exchanger configured to heat a reaction medium provided to the reactor using heat from the heated heat transfer fluid obtained from the wellbore; and the reactor comprises an insulation layer to reduce heat loss from the reactor.

11. The system of claim 1, wherein the depolymerization system further comprises a mixer configured to agitate contents of the reactor, wherein the mixer is powered, at least in part, by electricity generated using the heated heat transfer fluid from the wellbore.

12. The system of claim 6, wherein the reaction medium is the heated heat transfer fluid.

13. A system for thermal decomposition, the system comprising:

a wellbore extending from a surface to an underground reservoir at least partially filled with magma that includes molten rock, wherein the wellbore provides a heat exchange interface between the magma and a heat transfer fluid to form a heated heat transfer fluid;

a depolymerization system located externally to the wellbore, wherein the depolymerization system includes a reactor configured to house a decomposition reaction occurring at a reaction temperature which decomposes a polymer into an end product, wherein:

the reactor is a flow-through reactor configured to receive amounts of the polymer and a continuous flow of a reaction medium, a filter disposed in the flow-through reactor prevents the polymer from passing through the reactor, and the continuous flow of the reaction medium carries the end product out of the flow-through reactor; and a network of fluid conduits thermally coupling the wellbore to the depolymerization system, wherein the network of fluid conduits conveys the heated heat transfer fluid from the wellbore to the depolymerization system to provide heat for obtaining the reaction temperature.

14. The system of claim 13, wherein the network of fluid conduits conveys the heated heat transfer fluid to the reactor to provide the heat from the heated heat transfer fluid directly to the reactor.

15. The system of claim 13, further comprising:

a heat exchanger disposed in the network of fluid conduits, wherein the heat exchanger is configured to transfer the heat from the heated heat transfer fluid to an intermediate fluid that is provided to the reactor.

16. The system of claim 13, wherein the end product is a monomer of the polymer, and wherein:

the polymer is polytetrafluoroethylene (PTFE) and the reaction temperature is between 600° C.-900° C.;

the polymer is nylon 6 and the reaction temperature is between 250° C.-400° C.;

the polymer is polystyrene and the reaction temperature is between 350° C.-450° C.; or the polymer is polymethyl methacrylate (PMMA) and the reaction temperature is between 350° C.-400° C.

17. The system of claim 13, wherein the polymer is a polyolefin, and wherein the end product is an olefin that is combustible as fuel.

18. The system of claim 13, wherein the reactor comprises a heat exchange interface comprising a jacket that at least partially encircles an exterior of the reactor, wherein the heat exchange interface is configured to receive heated heat transfer fluid from the wellbore to provide heat for obtaining the reaction temperature.

19. The system of claim 13, wherein:

the depolymerization system further comprises a heat exchanger configured to heat a reaction medium provided to the reactor using heat from the heated heat transfer fluid obtained from the wellbore; and the reactor comprises an insulation layer to reduce heat loss from the reactor.

* * * * *